(12) United States Patent
Eguchi et al.

(10) Patent No.: US 12,105,551 B2
(45) Date of Patent: Oct. 1, 2024

(54) CONTROL SYSTEM

(71) Applicant: OMRON CORPORATION, Kyoto (JP)

(72) Inventors: Shigeyuki Eguchi, Kyoto (JP); Yoshihide Nishiyama, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 196 days.

(21) Appl. No.: 17/781,322

(22) PCT Filed: Dec. 1, 2020

(86) PCT No.: PCT/JP2020/044659
§ 371 (c)(1),
(2) Date: May 31, 2022

(87) PCT Pub. No.: WO2021/131530
PCT Pub. Date: Jul. 1, 2021

(65) Prior Publication Data
US 2023/0023970 A1 Jan. 26, 2023

(30) Foreign Application Priority Data
Dec. 25, 2019 (JP) .................................. 2019-234534

(51) Int. Cl.
G06F 1/12 (2006.01)
G05B 19/05 (2006.01)
(Continued)

(52) U.S. Cl.
CPC ............ *G06F 1/12* (2013.01); *G05B 19/058* (2013.01); *G06F 1/14* (2013.01); *G06F 11/1604* (2013.01);
(Continued)

(58) Field of Classification Search
CPC . G06F 1/12; G06F 1/14; G06F 1/0328; G06F 1/10; G06F 11/1675;
(Continued)

(56) References Cited

U.S. PATENT DOCUMENTS

2016/0124412 A1  5/2016  Fujita
2017/0269631 A1  9/2017  Bauknecht et al.
(Continued)

FOREIGN PATENT DOCUMENTS

DE  102020202690 B3 *  7/2021
DE  102021111071 A1 * 11/2022 ............... H04Q 9/00
(Continued)

OTHER PUBLICATIONS

"Method for Comparing and/or Synchronizing Counter Values From at Least Two Devices, Device and Arrangement of Devices". English Language Translation of DE-102021111071-A1. 2024. Clarivate Analytics. (Year: 2024).*
(Continued)

*Primary Examiner* — Thomas J. Cleary
(74) *Attorney, Agent, or Firm* — Sughrue Mion, PLLC

(57) ABSTRACT

A control system for factory automation includes a first unit and a second unit that exchange data with each other, and a synchronization module that synchronizes a control counter included in the first unit and a control counter included in the second unit using a clock. Each of the units includes an information storage that stores information on conversion for calculating a time from a counter value of the counter of the unit, the information being shared between the units.

14 Claims, 21 Drawing Sheets

(51) Int. Cl.
    *G06F 1/14*         (2006.01)
    *G06F 11/16*      (2006.01)

(52) U.S. Cl.
    CPC ............... *G05B 2219/13063* (2013.01); *G05B 2219/15063* (2013.01)

(58) Field of Classification Search
    CPC ............. G06F 11/1679; G06F 15/1732; G06F 15/17325; G06F 11/1604; H04J 3/06; H04J 3/0635; H04J 3/0638; H04J 3/0641; H04J 3/0644; H04J 3/0658; H04J 3/0685; H04J 3/0688; H04J 3/0697; H04L 7/0008; H04L 7/0012; G05B 19/058; G05B 2219/13063; G05B 2219/25126; G05B 2219/15063; G05B 2219/21055; G05B 19/0421
    See application file for complete search history.

(56) References Cited

U.S. PATENT DOCUMENTS

| | | |
|---|---|---|
| 2018/0329942 A1 | 11/2018 | Kawanoue |
| 2019/0056705 A1 | 2/2019 | Ukena et al. |
| 2019/0171192 A1 | 6/2019 | Nishiyama et al. |
| 2020/0244381 A1 | 7/2020 | Yoneda et al. |

FOREIGN PATENT DOCUMENTS

| | | |
|---|---|---|
| EP | 3 376 326 A1 | 9/2018 |
| JP | 2016-92544 A | 5/2016 |
| JP | 2018-151918 A | 9/2018 |
| JP | 2018-179865 A | 11/2018 |
| JP | 2018-190216 A | 11/2018 |
| JP | 2018-190473 A | 11/2018 |
| JP | 2019-146060 A | 8/2019 |
| WO | 2017/077628 A1 | 5/2017 |

OTHER PUBLICATIONS

"Synchronizing a Slave Timer With a Master Timer". English Language Translation of DE-102020202690-B3. 2024. Clarivate Analytics. (Year: 2024).*

Japanese Office Action dated Sep. 26, 2023 in Application No. 2019-234534.

Japanese Office Action issued May 30, 2023 in Application No. 2019-234534.

International Search Report for PCT/JP2020/044659 dated, Jan. 19, 2021 (PCT/ISA/210).

Written Opinion of the International Searching Authority for PCT/JP2020/044659 dated, Jan. 19, 2021 (PCT/ISA/237).

Communication dated Dec. 12, 2023 issued by the European Patent Office in application No. 20907744.5.

* cited by examiner

FIG.10

| 31 : TABLE ELEMENT | 32 : DESCRIPTION | 33 : TYPE/UNIT EXAMPLE | 34 : VALUE EXAMPLE |
|---|---|---|---|
| baseCount | REFERENCE CONTROL COUNTER VALUE | INTEGER (IN NANOSECONDS) THAT INCREASES WITH LAPSE OF TIME | 123,456,789,000 |
| baseTOD | TOD VALUE PAIRED WITH baseCount | timespec STRUCTURE DEFINED BY POSIX (SECONDS, NANOSECONDS) (EPOCH: 1/1/1970, 0:00:00) | [SECONDS: = 1558436215, NANOSECONDS: = 861847500] (= May 21 19:46:50 2019 (JST)) |
| timezone | SETTING OF TIMEZONE OF DISTRIBUTION SOURCE (CONTROLLER) OF CONVERSION TABLE | STRING | "JST" |
| timeSource | TIME SOURCE PLC SYSTEMS REFERS TO | STRING | (PROTOCOL, SERVER NAME, OR THE LIKE) |

OPTION: { timezone, timeSource }

TIME SYNCHRONIZATION INCOMPLETE

COUNTER SYNCHRONIZATION

FIG.23

TIME-SERIES DATA IN PROCESS 3B OF CONTROL DEVICE 2B

| 0001 | 1001 | PROCESS VARIABLE B1 | ... |
| 0002 | 1002 | PROCESS VARIABLE B2 | ... |
| 0003 | 1003 | PROCESS VARIABLE B3 | ... |

TIME  COUNTER VALUE

FIG.24

TIME-SERIES DATA IN PROCESS 3A OF CONTROL DEVICE 2A

| 0001 | 1001 | PROCESS VARIABLE A1 | ... |
| 0002 | 1002 | PROCESS VARIABLE A2 | ... |
| 0003 | 1003 | PROCESS VARIABLE A3 | ... |

TIME  COUNTER VALUE

LINE DATA

| TIME | COUNTER VALUE | DATA IN PROCESS 3A | DATA IN PROCESS 3B | ... |
|---|---|---|---|---|
| 001 | 1001 | PROCESS VARIABLE A1 | PROCESS VARIABLE B1 | ... |
| 002 | 1002 | PROCESS VARIABLE A2 | PROCESS VARIABLE B2 | ... |
| 003 | 1003 | PROCESS VARIABLE A3 | PROCESS VARIABLE B3 | ... |
| ⋮ | ⋮ | ⋮ | ⋮ | ⋮ |

CONTROL SYSTEM

CROSS REFERENCE TO RELATED APPLICATIONS

This application is a National Stage of International Application No. PCT/JP2020/044659 filed Dec. 1, 2020, claiming priority based on Japanese Patent Application No. 2019-234534, filed Dec. 25, 2019, the contents of each of which being herein incorporated by reference in their entireties.

TECHNICAL FIELD

The present disclosure relates to a control system for factory automation (FA).

BACKGROUND ART

In various production sites, FA technology using a control device such as a programmable logic controller (PLC) is widely used. A clock of a known control system for FA that manages the actual time is not high enough in accuracy, so that a control counter is installed separately from the clock, but a high-precision clock that manages the actual time is about to reach practical levels. As a method of how to use such a high-precision clock, a mechanism for synchronizing a control counter and the actual time has been proposed.

For example, Japanese Patent Laying-Open No. 2018-190216 (PTL 1) discloses a configuration where a PLC includes an internal clock, acquires a global time from a time server, and synchronizes the internal clock with the global time thus acquired.

CITATION LIST

Patent Literature

PTL 1: Japanese Patent Laying-Open No. 2018-190216

SUMMARY OF INVENTION

Technical Problem

The accuracy of the actual time that can be managed in the control system is on the increase, whereas it is desired that high-accuracy time be used in the control system with a known control counter.

It is therefore an object of the present disclosure to provide, using a known control counter, time with accuracy adapted to the environment or management of a control system.

Solution to Problem

A control system according to the present disclosure is a control system for factory automation including a first unit and a second unit configured to exchange data with each other, and a synchronization module configured to synchronize a control counter included in the first unit and a control counter included in the second unit using a clock. Each of the units includes an information storage configured to store information on conversion for calculating time from a counter value of the counter of the unit, the information being shared between the units.

According to the above-described disclosure, calculating the time from the counter value based on the information on conversion makes it possible to provide, using the known control counter, time with accuracy adapted to the environment or management of the control system.

In the above-described disclosure, the clock includes an external clock provided outside the units or an internal clock included in one of the first and second units.

According to the above-described disclosure, the external clock or the internal clock of the unit can be used as a clock used in synchronization between the units. This allows the control system to provide time with accuracy corresponding to the accuracy of the external clock or the internal clock of the unit, that is, with accuracy adapted to the environment or management of the control system.

In the above-described disclosure, when accuracy of time managed by the external clock satisfies a predetermined condition, the synchronization module adjusts, according to the time of the external clock, the counter value of the counter of the first unit and the counter value of the counter of the second unit that are synchronized with each other.

According to the above-described disclosure, when the accuracy of the external clock satisfies the predetermined condition, specifically, when the accuracy is high, the counter value of the counter of the first unit and the counter value of the counter of the second unit that are synchronized with each other are adjusted according to the time of the external clock, so that the counter values of the counters can be synchronized with the external clock.

In the above-described disclosure, when accuracy of time managed by the external clock does not satisfy a predetermined condition, the synchronization module synchronizes the counter of the first unit and the counter of the second unit based on time managed by the internal clock.

According to the above-described disclosure, when the accuracy of the external clock does not satisfy the predetermined condition, specifically, when the accuracy is low, the counter value of the counter of the first unit and the counter value of the counter of the second unit that are synchronized with each other can be synchronized with the time of the internal clock included in the unit.

In the above-described disclosure, the information on conversion includes a difference between the counter value of each of the units and a reference counter value, and a conversion formula for converting a reference time corresponding to the reference counter value into an actual time, and the reference time includes time of the clock.

According to the above-described disclosure, each of the units can calculate the time from the conversion formula using the reference counter value, the time of the clock corresponding to the reference counter value, and the counter value of the unit.

In the above-described disclosure, the one of the units includes a management module configured to manage the information on conversion shared with the other unit, and the management module updates the information on conversion that has been shared in accordance with the clock used in synchronization of the control counters.

According to the above-described disclosure, the management module can update the information on conversion shared between the units in accordance with the clock used in synchronization of the counters. For example, when the clock is the external clock, that is, when the accuracy of management of the time of the external clock satisfies a predetermined condition, the information on conversion is not updated and remains unchanged, but when the accuracy does not satisfy the predetermined condition, the information on conversion is updated based on the time of the internal clock.

In the above-described disclosure, when accuracy of time managed by the external clock does not satisfy a predetermined condition, the management module updates the conversion formula to set the reference counter value and the reference time to the counter value of the one of the units and time of the internal clock corresponding to the counter value, respectively.

According to the above-described disclosure, the conversion formula can be updated by setting the counter value corresponding to the time of the internal clock used in synchronization of the counters.

In the above-described disclosure, the first unit exchanges data with the second unit over a data bus, the control system further includes a third unit connected to the one of the units over a network, the synchronization module further synchronizes the counter included in the one of the units and a control counter included in the third unit, and the third unit stores the information on conversion shared among the units.

According to the above-described disclosure, the configuration of the synchronization of the counters and the configuration of the time conversion based on the information on conversion can also be applied to the units on the network.

In the above-described disclosure, the information on conversion includes information on accuracy of time managed by the clock used in synchronization of the counters.

According to the above-described disclosure, the information on accuracy of time managed by the clock used in synchronization of the counters can be provided to each of the units via the information on conversion.

In the above-described disclosure, each of the units calculates the counter value of a corresponding one of the counters into the time in accordance with the information on conversion that has been shared, and outputs a response including the time obtained by the conversion to an inquiry about the time received from an application.

According to the above-described disclosure, it is possible to provide a configuration where the application of each of the units refers to (inquires about) the time obtained by the conversion.

In the above-described disclosure, the conversion is performed when the inquiry is received.

According to the above-described disclosure, a configuration where the conversion is performed for each inquiry can be provided as a configuration where the time obtained by the conversion is provided to the application. This allows the application to acquire the latest conversion value (time).

In the above-described disclosure, each of the units stores the time obtained by the conversion, and the response includes the time obtained by the conversion and stored.

According to the above-described disclosure, it is possible to provide the time stored when the conversion is performed (already obtained by the conversion) for each inquiry from the application, rather than performing the conversion. This eliminates the need of performing the conversion for each inquiry, and it is therefore possible to reduce a load of the conversion.

Advantageous Effects of Invention

According to the present disclosure, it is possible to provide, using a known control counter, time with accuracy adapted to the environment or management of the control system.

BRIEF DESCRIPTION OF DRAWINGS

FIG. 10 is a diagram schematically illustrating an example of time conversion information 30 according to the present embodiment.

FIG. 23 is a diagram schematically illustrating frames of time-series data created by control device 2 according to the present embodiment.

FIG. 24 is a diagram schematically illustrating frames of time-series data created by control device 2 according to the present embodiment.

FIG. 25 is a diagram schematically illustrating an example of a time-series DB 450 according to the present embodiment.

DESCRIPTION OF EMBODIMENTS

Figure 1:
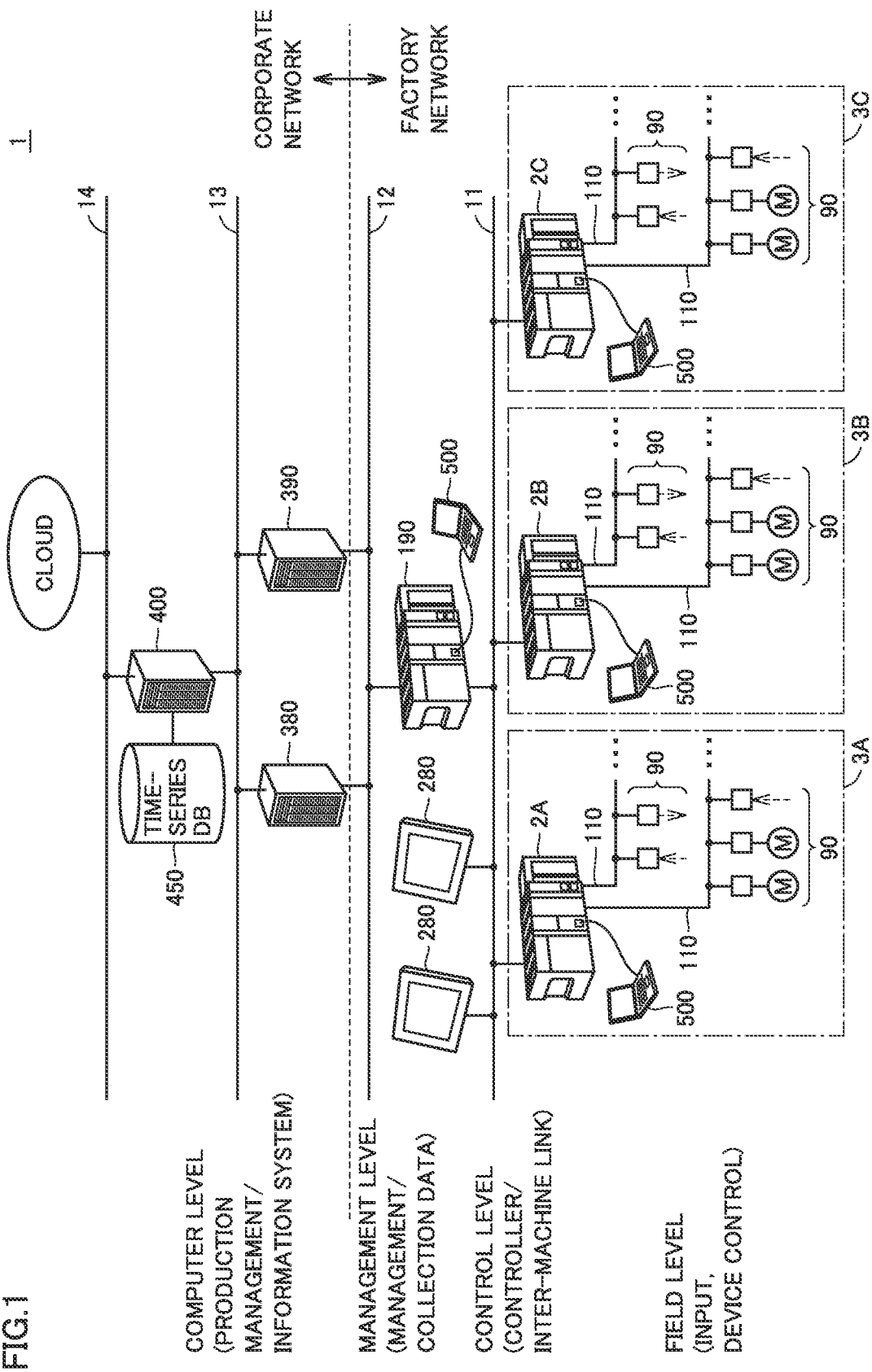
FIG. 1 is a diagram schematically illustrating an example of an overall configuration of a control system 1 according to the present embodiment.

Embodiments of the present invention will be described in detail with reference to the drawings. Note that the same or corresponding parts in the drawings are denoted by the same reference numerals, and no redundant description will be given of such parts.

A. Application Example

Figure 9:
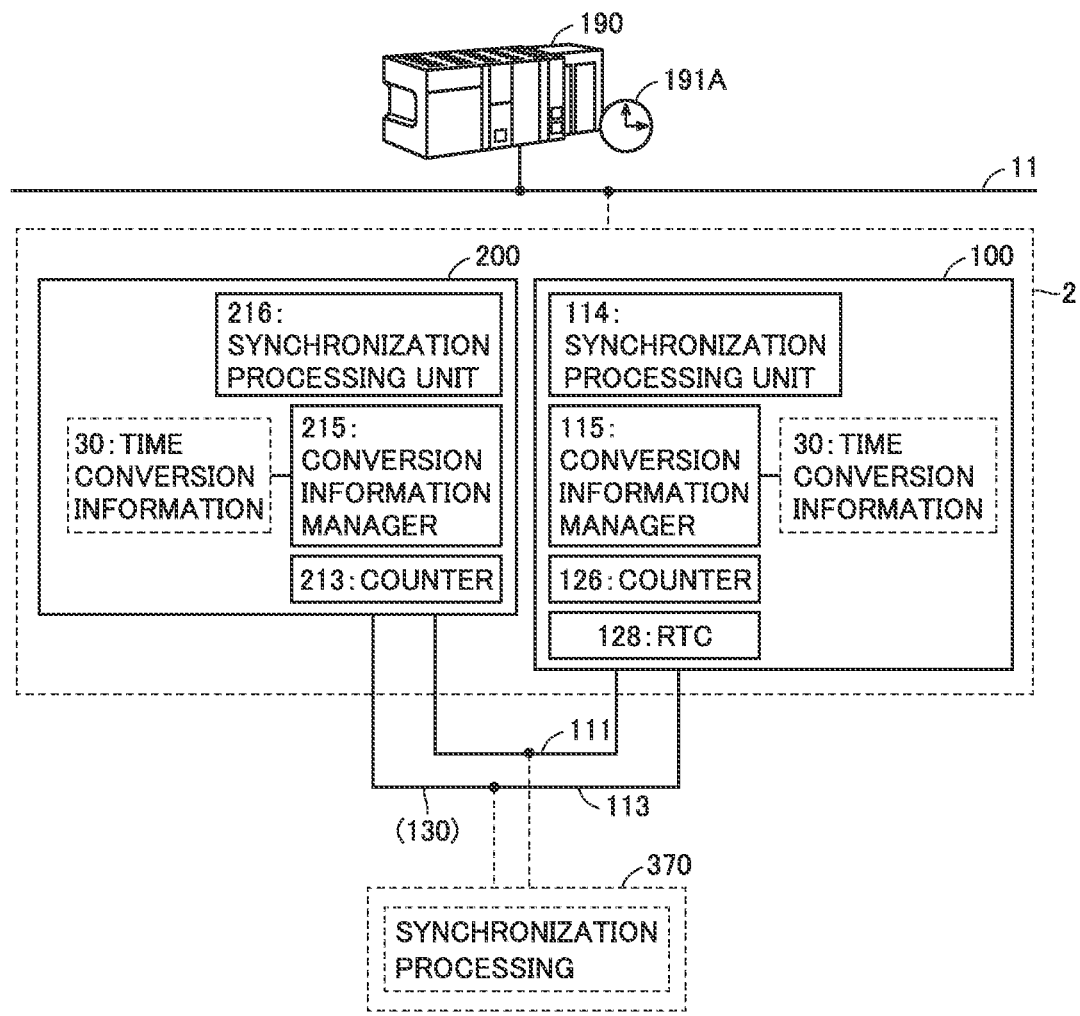
FIG. 9 is a diagram schematically illustrating an example of a configuration for time synchronization managed by control device 2 according to the present embodiment.

First, an example of a case to which the present invention is applied will be described. FIG. 9 is a diagram schematically illustrating an example of a configuration for time synchronization managed by a control device 2 according to the present embodiment. A control system for factory automation includes a plurality of control devices. Each control device corresponds to, for example, a PLC. The control device includes a first unit (CPU unit 100) and a second unit (function unit 200) that exchange data with each other. The control system includes a synchronization processing unit (a synchronization processing unit 216, a synchronization processing unit 114) that uses a clock to synchronize a control counter 126 provided in the first unit with a control counter 213 provided in the second unit. Each unit stores time conversion information 30 on conversion for converting a counter value of the counter included in the unit into time, time conversion information 30 being shared between the units. A conversion information manager 115 (conversion information manager 215) distributes time conversion information 30 so as to cause time conversion information 30 to be shared between the units.

Therefore, the control system includes a configuration where the control counters are synchronized with each other between the units, and a configuration where time conversion information 30 on conversion for calculating time from the counter values of the counters thus synchronized is shared between the units. With both of the configurations, it is possible to implement, in the control system, a mechanism for providing the time synchronized between units using a known control counter included in each unit.

The clock used for counter synchronization may include a master clock 191A that is an external clock provided outside the units or an internal clock included in one of the first unit and the second unit (for example, a real time clock (RTC) 128 included in CPU unit 100). This makes it possible to provide, to the control system, the time using the clock accessible to the system, that is, time with accuracy adapted to an available environment and management. This allows the control system to provide time that can be flexibly adapted to the environment or management of the system.

A description will be given below of a more specific application example of the present embodiment.

The following description will be given of a PLC as a typical example of the "control device", but the technical idea disclosed herein is not limited by the name of the PLC and is applicable to any control device. Further, the entire system including the PLC (control device) is hereinafter also referred to as a "control system".

B. Overall Configuration of Control System

First, an overall configuration of a control system applicable to FA according to the present embodiment will be described. FIG. 1 is a diagram schematically illustrating an example of an overall configuration of a control system 1 according to the present embodiment.

Referring to FIG. 1, in control system 1, a plurality of levels of networks are connected to each other, and a different function is assigned to each of the levels of networks. Specifically, four levels of networks 11 to 14 are provided, for example, but it is not limited to such a configuration.

Network 11 is a control-level network. The plurality of control devices 2A, 2B, and 2C (hereinafter, may be collectively referred to as "control device 2"), a device/line management device 190, and a display device 280 providing a supervisory control and data acquisition (SCADA) function are connected to network 11, and a data link that allows exchange of data between the devices is established over network 11. Device/line management device 190 and display device 280 each correspond to a device that is connected to the network and manages a production line. Network 11 is primarily responsible for transmission of information on the control system.

Field machines 90 of various types such as a sensor and an actuator are connected to control device 2. Such field machines 90 may be directly connected to control device 2 via an input/output unit attached to control device 2, or alternatively, may be connected to control device 2 over network 110. In FIG. 1, control device 2 is connected to one or more networks 110. One or more field machines 90 are connected to each network 110. One or more field machines 90 each include an actuator that applies some physical action to a manufacturing device, a production line, or the like (hereinafter, collectively referred to as a "field"), an input/output device that exchanges information with the field, and the like. Therefore, in addition to four levels of networks 11 to 14, a field-level network 110 is further added to control system 1 illustrated in FIG. 1.

Data exchanged between control device 2 and field machine 90 over network 110 is updated at short intervals of several hundred microsecond order to several ten millisecond order. Note that such processing of updating exchanged data is also referred to as input/output refresh processing.

Network 12 is provided as a management-level network. Device/line management device 190 that manages devices and lines, and manufacturing management devices 380 and 390 that manage a manufacturing plan and the like are connected to network 12. Device/line management device 190 and manufacturing management devices 380 and 390 exchange management information such as the manufacturing plan and exchange information on the devices or lines over network 12.

Network 13 is provided as a computer-level network. Manufacturing management devices 380 and 390 and a manufacturing execution system (MES) 400 that manages a time-series database (DB) 450 are connected to network 13. Manufacturing management devices 380 and 390, and manufacturing execution system 400 exchange production management data and information system data over network 13.

Manufacturing execution system 400 stores a process variable that is a value collected over network 13 and input from field machine 90 in time-series DB 450 as time-series data in chronological order.

Specifically, according to the present embodiment, control device 2 is capable of creating a frame including a designated process variable. Control device 2 transfers the frame thus created to manufacturing execution system 400 over networks 11, 12, and 13. Manufacturing execution system 400 stores the frame including the process variable received from control device 2 in time-series DB 450 in chronological order.

According to the present embodiment, the data stored in time-series DB 450 is also referred to as "time-series data". According to the present embodiment, the "time-series data" corresponds to a set of values obtained as a result of continuous (or alternatively, discontinuous, at regular intervals) observation of a temporal change in data (process variable) for any desired target.

Herein, the "process variable" is a concept serving as a general term of values (real values) available for control operation in control device 2 and may typically include a value acquired from the control target and input for the control operation (such as a measurement value acquired from the field), an output value for the control target determined by the control operation based on the input value thus acquired (such as a manipulated variable given to the field), a calculated value calculated through the control operation (any variable value), and the like. That is, the "process variable" includes any value that can be stored as data in control device 2 or can be output as data from control device 2 to the outside.

Examples of network 14 include an external network such as the Internet. Manufacturing execution system 400 and an external device on a cloud are connected to network 14. Manufacturing execution system 400 exchanges data with a device on the cloud to transfer the data of time-series DB 450 to the device on the cloud.

A support device 500 may be connected to control device 2. Support device 500 is a device that supports preparation necessary for control device 2 to control the control target. Support device 500 may also be connected to device/line management device 190.

Control devices 2A, 2B, and 2C connected to network 11 of control system 1 are provided for different processes 3A, 3B, and 3C, respectively. Specifically, processes 3A, 3B, and 3C may be, but not limited to, a process of assembling workpieces into a product (work), a process of painting the assembled product, a process of inspecting the painted product, respectively.

In control system 1 illustrated in FIG. 1, network 12, and network 11 and network 110 lower in level than network 12 are also referred to as a "factory network" and provides control-system communications for exchanging data used in actual control of the machines (hereinafter, may be collectively referred to as "control-system data"). On the other hand, network 13 and network 14 higher in level are also referred to as a "corporate network" and provide information-system communications for exchanging data used in supervising, management, and control of a production activity and the like in a production line/factory (hereinafter, may be collectively referred to as "information-system data"). For networks 11 to 14 and network 110, protocols and frameworks adapted to such differences in required characteristics are used. A protocol used on network 11 and network 12 belonging to the factory network may be EtherNet/IP (registered trademark), which is an industrial open network obtained by implementing a control protocol on standard Ethernet (registered trademark). Further, a protocol used on network 110 may be EtherCAT (registered trademark), which is an example of a machine control network. Note that the protocol (first protocol) used on network 11 and the protocol (second protocol) used on network 110 may be the same or different. The application of such network technology suitable for machine control makes it possible to provide real-time constraints under which the deadline for transmission between devices is guaranteed.

On the other hand, a protocol used on networks 13 and 14 belonging to the corporate network may be the standard Ethernet or the like so as to adapt to various type of connection destinations. The application of the standard Ethernet makes it possible to eliminate restrictions on the amount of transmission data and the like.

C. Time Synchronization in Control System 1

Over the factory network illustrated in FIG. 1, each of the plurality of control devices 2A, 2B, and 2C connected to network 11 transmits and receives data to and from one or more field machines 90 connected over network 110. Specifically, control device 2 performs processing of collecting data (input data) collected or generated by field machine 90 (input processing), processing of generating data (output data) such as an instruction to be issued to field machine 90 (calculation processing), processing of transmitting the output data thus generated to target field machine 90 (output processing), and the like.

Further, network 110 must guarantee the arrival time of data. Therefore, control device 2 includes timers that provide a timing for data transmission and are time-synchronized with each other among entities (that is, one or more field machines 90) to or from which data is transmitted or received.

However, when the plurality of control devices 2 are not time-synchronized, field machine 90 connected to one control device 2 and field machine 90 connected to another control device 2 cannot be time-synchronized, for example. This may prevent the timings for the input/output refresh processing from matching with each other, so that it is difficult for the plurality of field machines 90 connected to different control devices 2 to operate in a coordinated manner.

Further, in control system 1 according to the present embodiment, the timers of the plurality of control devices 2 are time-synchronized with each other. This makes it possible to bring the plurality of field machines 90 connected to different control devices 2 under coordinated control between different processes.

A description will be given below of a time synchronization function provided by control system 1 according to the present embodiment.

c1. Example of Network Configuration

Figure 2:
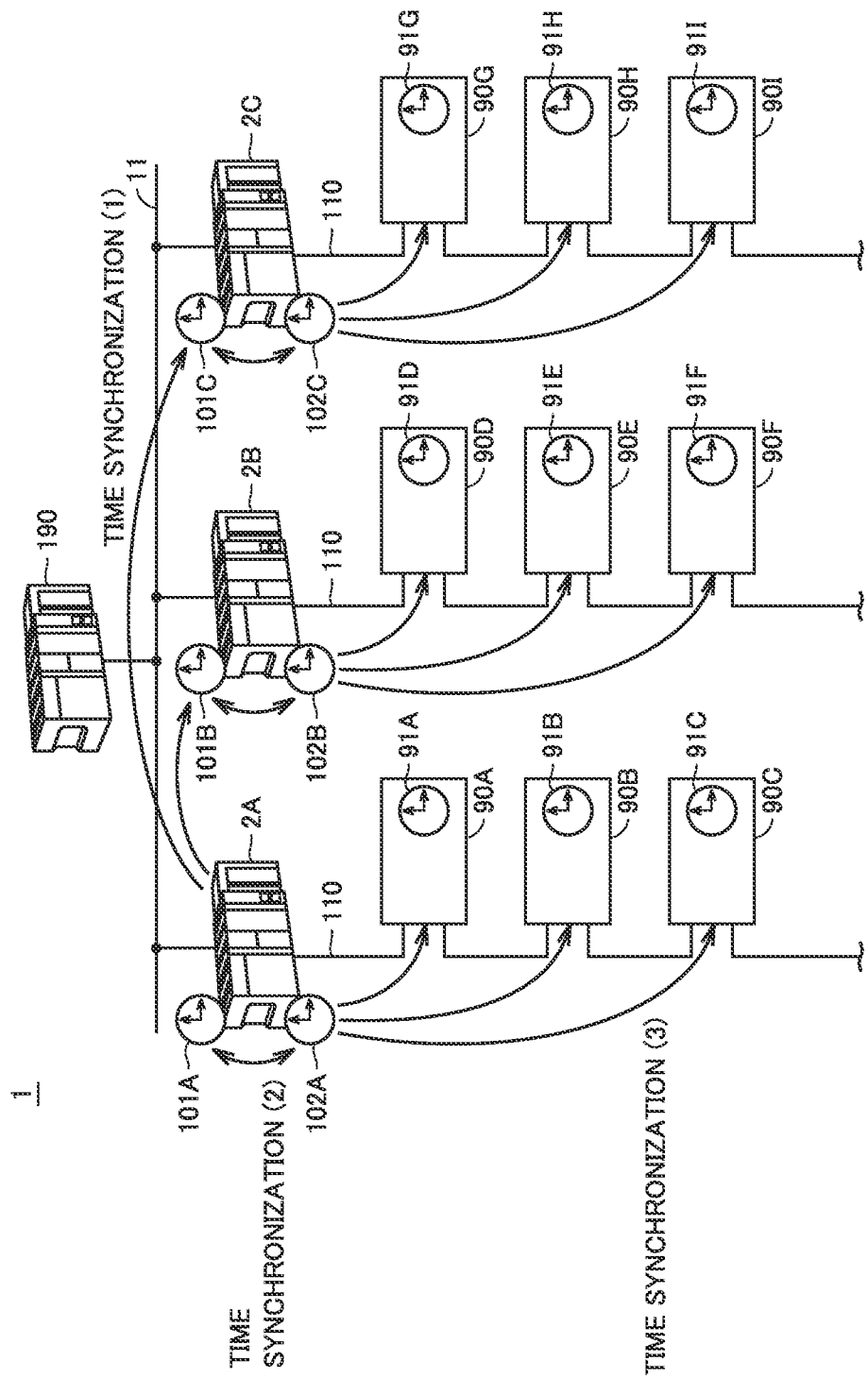
FIG. 2 is a diagram schematically illustrating an example of a network configuration of control system 1 according to the present embodiment.

Next, an example of the network configuration of control system 1 according to the present embodiment will be described. FIG. 2 is a diagram schematically illustrating an example of a network configuration of control system 1 according to the present embodiment.

Control system 1 illustrated in FIG. 2 includes the plurality of control devices 2A, 2B, and 2C and a plurality of field machines 90A to 90I. As an example, a network that allows at least some control devices to be daisy-chained is applied to control system 1. Control devices 2A, 2B, and 2C each serve as a master responsible for managing data transmission over a corresponding network 110. Field machines 90A to 90I each serve as a slave that transmits data in accordance with an instruction from a corresponding master.

Control devices 2A, 2B, and 2C are connected to control-level network 11 (upper-level network). For example, device/line management device 190 is connected to network 11.

Field machines 90A, 90B, and 90C are daisy-chained in series over network 110 connected to control device 2A, field machines 90D, 90E, and 90F are daisy-chained in series over network 110 connected to control device 2B, and field machines 90G, 90H, and 90I are daisy-chained in series over network 110 connected to control device 2C.

In network 110, control device 2 and one or more field machines 90 can be regarded as communication devices capable of transmitting data. In the example illustrated in FIG. 2, control device 2 and one or more field machines 90 are each capable of transmitting, upon receipt of data transmitted over the network from any adjacent communication device connected to the network, the data to another adjacent communication device connected to the network as needed.

Figure 3:
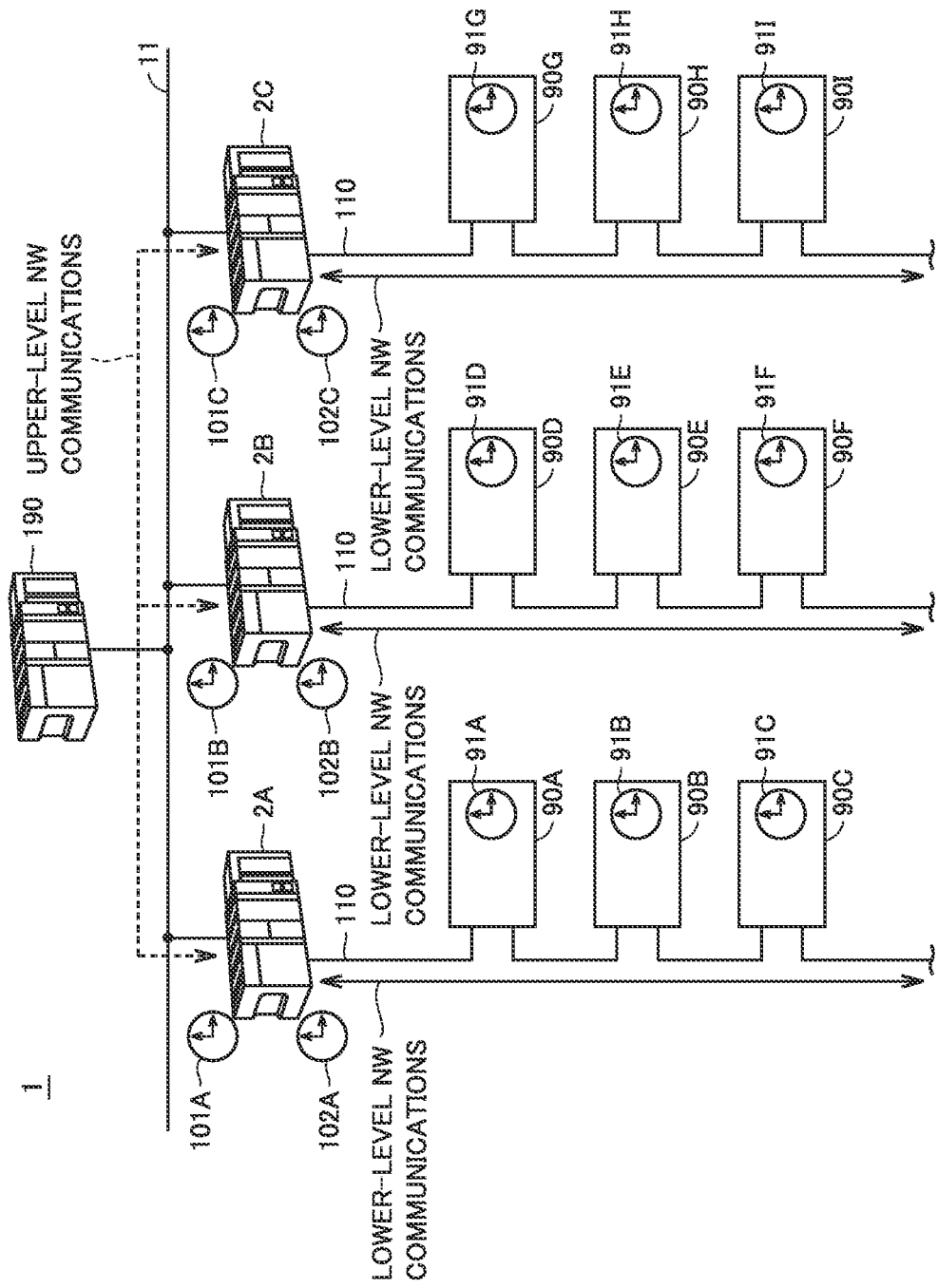
FIG. 3 is a diagram schematically illustrating data communication processing performed by control system 1 according to the present embodiment.

In control system 1 according to the present embodiment, transmission/reception timings are synchronized among the plurality of communication devices connected to network 110, that is, control device 2 and one or more field machines 90 (corresponding to time synchronization (3) in FIG. 3). Specifically, control device 2 and one or more field machines 90 each include a timer time-synchronized with each other (alternatively, a counter that is incremented or decremented in synchronization with each other). Control device 2 and one or more field machines 90 each determine a data transmission or reception timing in accordance with the time-synchronized timers or counters.

Note that, according to the present embodiment, the "timing" represents a timing, a period of time, or a time when some event occurs. Further, the "time synchronization" indicates synchronization among respective timers, time data, or the like included in devices.

Referring to FIG. 2, control device 2A includes a timer 102A, and field devices 90A, 90B, and 90C include timers 91A, 91B, and 91C, respectively. Timer 102A of control device 2A serves as a master, and timers 91A, 91B, and 91C of field machines 90A, 90B, and 90C are synchronized with the timing based on the master. For example, a value based on the timer value of timer 102A is set to timers 91A, 91B, and 91C.

Control device 2B includes a timer 102B, and field machines 90D, 90E, and 90F include timers 91D, 91E, and 91F, respectively. Timer 102B of control device 2B serves as a master, and timers 91D, 91E, and 91F of field machines 90D, 90E, and 90F are synchronized with the timing based on the master. For example, a value based on the timer value of timer 102B is set to timers 91D, 91E, and 91F.

Control device 2C includes a timer 102C, and field machines 90G, 90H, and 90I include timers 91G, 91H, and 91I, respectively. Timer 102C of control device 2C serves as a master, and timers 91G, 91H, and 91I of field machines 90G, 90H, and 90I are synchronized with the timing based on the master. For example, a value based on the timer value of timer 102C is set to timers 91G, 91H, 91I.

That is, control devices 2A, 2B, and 2C each serve as a master responsible for managing data transmission over a corresponding network 110, and field machine 90 connected to each control device 2 serves a slave that transmits data in accordance with an instruction from the master. The timers are time-synchronized with each other between the master and the slave, thereby allowing data transmission timings and the like to match with each other between control device 2 and field machine 90 that make up network 110.

In the example illustrated in FIG. 2, control device 2A further includes a timer 101A time-synchronized with timer 102A. Control device 2B further includes timer 101B time-synchronized with timer 102B. Control device 2C further includes timer 101C time-synchronized with timer 102C (corresponding to time synchronization (2) in FIG. 3). In control system 1, for example, any one of timers 101A, 101B, and 101C may serve as a master of entire control system 1.

In FIG. 2, as an example, timer 101A of control device 2A is set as a master, and the timers of control devices 2B, 2C are time-synchronized with the master. This allows the plurality of control devices 2A, 2B, and 2C to be time-synchronized with each other (corresponding to time synchronization (1) in FIG. 3).

As described above, the plurality of control devices 2A, 2B, and 2C each include an inter-device timer (timers 101A, 101B and 101C) time-synchronized with each other among the plurality of control devices 2A, 2B, and 2C, and an inter-machine timer (timers 102A, 102B and 102C) time-synchronized with one or more field machines 90 connected over network 110, and the inter-device timer and the inter-machine timer are time-synchronized with each other. As a result, the inter-machine timer (timer 102A) time-synchronized between control device 2A, and field machines 90A, 90B, and 90C, the inter-machine timer (timer 102B) time-synchronized between control device 2B, and field machines 90D, 90E, and 90F, and the inter-machine timer (timer 102C) time-synchronized between control device 2C, and field machines 90G, 90H, and 90I are time-synchronized with each other.

Note that FIG. 2 illustrates a configuration example where the timer of any control device 2 is set as a master, but the time acquired from the outside over network 11 may be set as a master, or a timer of an external device such as device/line management device 190 may be set as a master.

c2. Time-Synchronized Data Communication

FIG. 3 is a diagram schematically illustrating data communication processing performed by control system 1 according to the present embodiment. Referring to FIG. 3, data is exchanged between control device 2A, and the plurality of field machines 90A, 90B, and 90C connected to network 110 at predetermined system intervals.

Data is exchanged at the predetermined system intervals between control device 2B, and the plurality of field machines 90D, 90E, and 90F and between control device 2C, and the plurality of field machines 90G, 90H, and 90I. Such a data exchange puts control device 2 and field machine 90 into control operation. In the following description, communications on network 110 are also referred to as "lower-level network (NW) communications".

Among control devices 2A, 2B, and 2C connected to upper-level network 11, data collected from field machine 90 through the input processing performed by each control device 2, output data generated through the calculation processing, and the like are exchanged at the predetermined system intervals. Such a data exchange allows field machine 90 connected to control device 2A, field machine 90 connected to control device 2B, and field machine 90 connected to control device 2C to operate in a coordinated manner. That is, this allows field machines 90 to operate in a coordinated manner between different processes. In the following description, communications on network 11 are also referred to as "upper-level network (NW) communications".

In control system 1 according to the present embodiment, the start timing of data transmission over the lower-level network communications is determined based on the timers time-synchronized with each other among the plurality of control devices 2A, 2B, and 2C. This allows, among the plurality of control devices 2A, 2B, and 2C, the timings for exchanging data with field machines 90 and the like to match with each other, so that the timings for controlling field machines 90 can be synchronized with each other between different processes.

D. Configuration and Time Synchronization of Control Device 2

Figure 4:
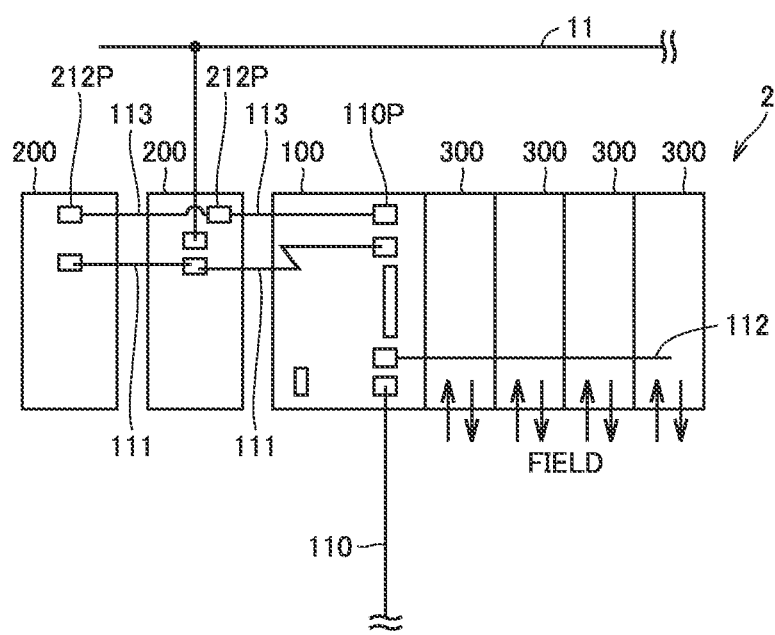
FIG. 4 is a diagram schematically illustrating an example of a configuration of each unit of a control device 2 according to the present embodiment.

FIG. 4 is a diagram schematically illustrating an example of a configuration of each unit of control device 2 according to the present embodiment. Referring to FIG. 4, control device 2 provided in control system 1 includes a unit 100 (hereinafter, referred to as CPU unit 100) of a central processing unit (CPU), one or more function units 200, and one or more function units 300. In FIG. 4, the number of function units 300 provided in control device 2 is four, but is not limited to four as long as the number is greater than or equal to one. The number of function units 200 provided in control device 2 is two, but is not limited to two as long as the number is greater than or equal to one. CPU unit 100 connects to one or more function units 200 over data bus 111 and signal line 113. Further, CPU unit 100 connects to one or more function units 300 over a data bus 112.

Data bus 111 is, but not limited to, a bus of an 110 serial interface adhering to, for example, PCI Express (PCIe). Signal line 113 is an optical fiber cable or an electrical signal cable, and transmits a time synchronization signal 130 (to be described later) serving as a trigger signal.

CPU unit 100 includes a program execution unit that executes a program created to adapt to the control target. More specifically, CPU unit 100 corresponds to an operation processing unit that executes a system program and various user programs.

Function unit 200 is responsible for communication processing or information processing. Function unit 200 includes an interface that connects to data bus 111 and a signal port 212P that connects to signal line 113. Function unit 200 is disposed between network 11 and control device 2, so that CPU unit 100 can communicate data with a device connected to network 11 via function unit 200. Further, signal line 113 is connected between a signal port 110P of CPU unit 100 and signal port 212P of function unit 200, so that CPU unit 100 and function unit 200 receive time synchronization signal 130 over signal line 113.

According to the present embodiment, function unit 200 monitors access to CPU unit 100 from the Internet such as network 14 and access to CPU unit 100 from another device in network 11, and notifies, when detecting any security incident, the inside or the outside of control device 2 of the security incident thus detected. Note that the information processing performed by function unit 200 is not limited to the security monitoring processing.

Function unit 300 serves as a so-called I/O unit that exchanges signals with a facility and apparatus to be controlled such as field machine 90 and various devices (sensors, actuators, and the like) included in the facility and apparatus. Specifically, function unit 300 outputs a manipulated variable calculated by CPU unit 100 to the field or collects an input value from the field. Function unit 300 includes, for example, at least one of a digital input (DI) module that receives a digital signal from the control target, a digital output (DO) module that outputs a digital signal to the control target, an analog input (AI) module that receives an analog signal from the control target, or an analog output (AO) module that outputs an analog signal to the control target. Furthermore, function unit 300 may include a controller having a special function such as proportional integral derivative (PID) control or motion control implemented therein.

Function unit 200 or function unit 300 may be provided as an expansion unit that can be externally attached to CPU unit 100 in a detachable manner.

d1. Configuration of CPU Unit 100

Figure 5:
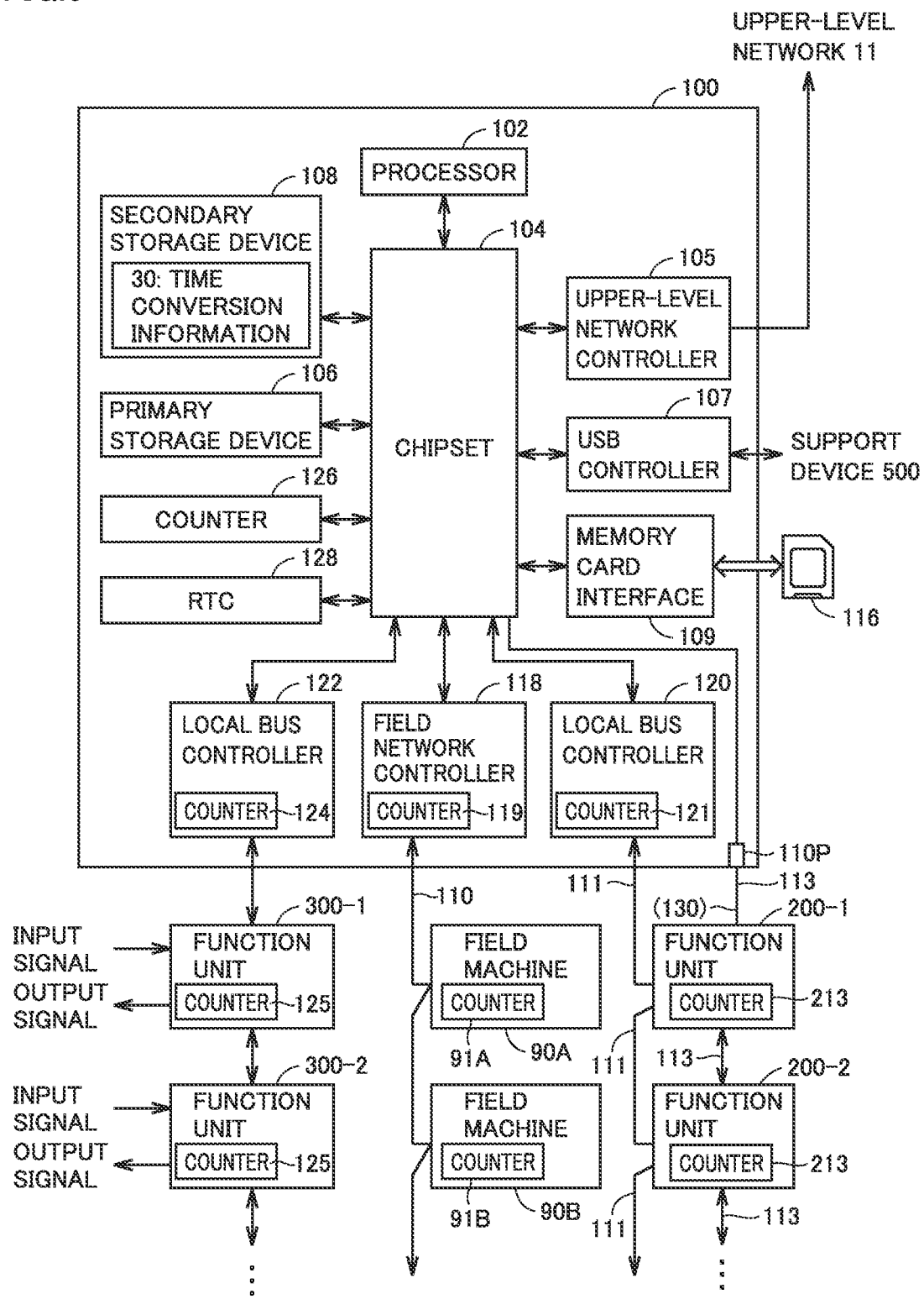
FIG. 5 is a block diagram illustrating an example of a hardware configuration of a CPU unit 100 provided in control device 2 according to the present embodiment.

FIG. 5 is a block diagram illustrating an example of a hardware configuration of CPU unit 100 provided in control device 2 according to the present embodiment.

CPU unit 100 includes a processor 102, a chipset 104, a primary storage device 106, a secondary storage device 108, an upper-level network controller 105, a universal serial bus (USB) controller 107, a memory card interface 109, local bus controllers 120, 122, a field network controller 118, a counter 126, a real time clock (RTC) 128, and signal port 110P.

Processor 102 includes a CPU, a microprocessor unit (MPU), a graphics processing unit (GPU), or the like, and reads various programs stored in secondary storage device 108, deploys the programs into primary storage device 106, and executes the programs to perform control and various processing on the control target as described later. Secondary storage device 108 includes, for example, a non-volatile storage device such as a hard disk drive (HDD) or a solid state drive (SSD). Primary storage device 106 includes a volatile storage device such as a dynamic random access memory (DRAM) or a static random access memory (SRAM).

Chipset 104 controls processor 102 and each device to perform processing all over CPU unit 100.

Secondary storage device 108 stores a user program created to adapt to a manufacturing device or facility to be controlled, in addition to the system program responsible for providing basic functions. Secondary storage device 108 further stores time conversion information 30. Time conversion information 30 is information on conversion for calculating time (actual time) from the value of the counter included in each unit. Secondary storage device 108 further stores a time-series database as described later. Note that the device that stores time conversion information 30 is not limited to secondary storage device 108, and time conversion information 30 may be stored in primary storage device 106.

Upper-level network controller 105 exchanges data with manufacturing execution system 400 or a device on the cloud (see FIG. 1) over upper-level network 11. USB controller 107 controls data exchanges with support device 500 over a USB connection.

Memory card interface 109 is configured to receive a memory card 116 in a detachable manner and is capable of writing data to memory card 116 and reading various data (such as the user program or trace data) from memory card 116.

Counter 126 is used as a time reference for use in managing the execution timing at which various processing is performed in CPU unit 100. Counter 126 typically increments or decrements a counter value at predetermined intervals. Counter 126 may be implemented by a high precision event timer (HPET) that is a hardware timer provided on a system bus that drives processor 102, or by a dedicated circuit such as an application specific integrated circuit (ASIC) or a field-programmable gate array (FPGA).

RTC 128 is a type of counter capable of measuring the passage of time, and provides the current time to processor 102 and the like.

Local bus controller 122 is an interface that exchanges data with function unit 300-1, 300-2, ... connectable to CPU unit 100. Local bus controller 122 includes a counter 124 used as a time reference for use in managing timing with function units 300-1, 300-2, . . . that are other devices connected over data bus 112. Likewise, each of function units 300-1, 300-2, . . . includes counter 125 used as a time reference for use in managing timing with local bus controller 122 and other function units 300.

Counter 124 and counter 125 may be the same in configuration as counter 126 described above.

Field network controller 118 controls data exchanges with other devices including field machine 90 over network 110. Field network controller 118 includes a counter 119 used as a time reference for use in managing timing with the other devices. In FIG. 5, a timer 91 of field device 90 is denoted by counters 91A, 91B, . . . .

Local bus controller 120 is an interface that exchanges data with function units 200-1, 200-2, . . . connectable to CPU unit 100. Local bus controller 120 includes a counter 121 used as a time reference for use in managing timing with function units 200-1, 200-2, . . . that are other devices connected over data bus 111. Likewise, each of function units 200-1, 200-2, . . . includes a counter 213 used as a time reference for use in managing timing with local bus controller 120. Counter 121 and counter 213 may be the same in configuration as counter 126 described above.

Further, each device on network 110 also includes a counter used as a time reference for use in managing timing with field network controller 118.

Counter 119 and the counter (counter 91) provided in the device such as field machine 90 may be the same in configuration as counter 126 described above.

Field network controller 118 serves as a communication master responsible for periodic communications over network 110, and field network controller 118 continuously checks a difference between the counter value indicated by the counter provided in each device connected to a field bus and the counter value indicated by counter 119, and outputs, as needed, a synchronization signal for instructing a device having a difference in counter value to correct the counter value. As described above, field network controller 118 has a synchronization management function of issuing an instruction to a device to match the counter value indicated by the counter of the device with the counter value indicated by counter 119.

Signal port 110P is connected to signal line 113 over which time synchronization signal 130 is transmitted.

In CPU unit 100 illustrated in FIG. 5, counter 119, counter 121, and counter 124 are synchronized with counter 126.

FIG. 5 illustrates the configuration example where processor 102 executes a program to provide necessary functions, but some or all of the functions thus provided may be implemented by a dedicated hardware circuit (for example, an application specific integrated circuit (ASIC), a field-programmable gate array (FPGA), or the like). Alternatively, a core part of CPU unit 100 may be implemented by hardware having a general-purpose architecture (for example, an industrial personal computer based on a general-purpose personal computer). Further, a plurality of operating systems (OSs) having different uses may be executed in parallel using a virtualization technology, and a necessary application may be executed on each OS.

Control system 1 according to the present embodiment has a configuration where CPU unit 100 and support device 500 are separately provided, or alternatively, may have a configuration where all or some of the functions of CPU unit 100 and support device 500 are integrated into a single device.

d2. Configuration of Function Unit 200

Figure 6:
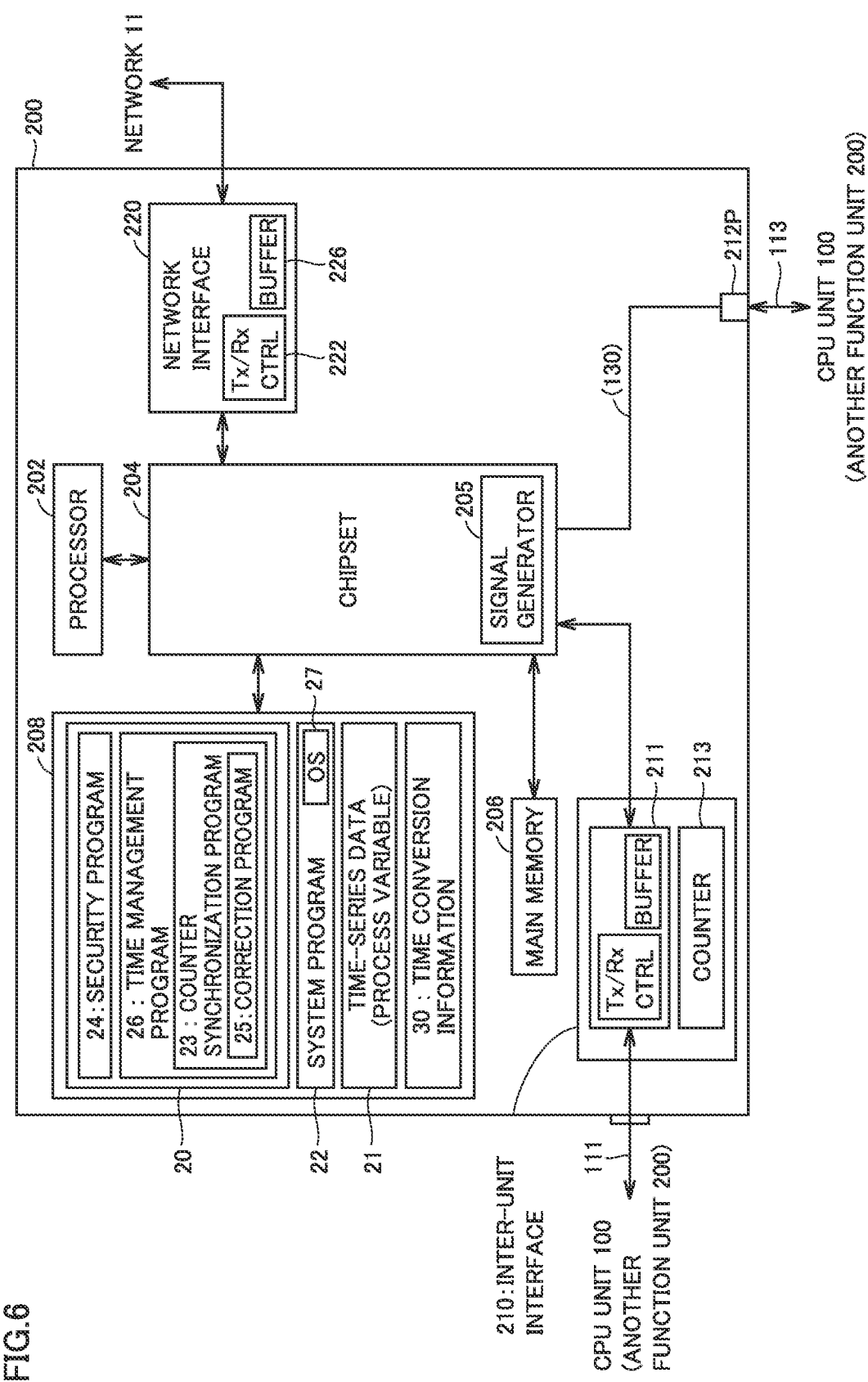
FIG. 6 is a block diagram illustrating an example of a hardware configuration of a function unit 200 provided in control device 2 according to the present embodiment.

FIG. 6 is a block diagram illustrating an example of a hardware configuration of function unit 200 provided in control device 2 according to the present embodiment. Referring to FIG. 6, function unit 200 includes a processor 202, a chipset 204, a main memory 206, a storage 208, an inter-unit interface 210, a network interface 220, and signal port 212P. Signal port 212P is connected to signal line 113 over which time synchronization signal 130 is transmitted.

Processor 202 includes a CPU, an MPU, a GPU, or the like. As with CPU unit 100 described above, function unit 200 includes one or more processors 202 and/or processor 202 having one or more cores. Chipset 204 controls processor 202 and peripheral elements to perform processing all over function unit 200. Chipset 204 includes a signal generator 205 that is a circuit element responsible for generating time synchronization signal 130. Time synchronization signal 130 is transmitted from signal generator 205 to signal line 113 via signal port 212P. Main memory 206 includes a volatile storage device such as a DRAM or an SRAM. Storage 208 includes, for example, a non-volatile storage device such as a flash memory.

Processor 202 reads various programs stored in storage 208, deploys the programs into main memory 206, and executes the programs to perform processing such as monitoring of a security incident. Storage 208 stores a system program 22 including an operating system (OS) 27 for implementing basic processing and a user program 20. Further, storage 208 includes a storage area 21 where time conversion information 30 that is information on conversion for calculating the actual time from the counter value of counter 213, and stores time-series data on process variables collected by function unit 200. Note that the storage device that stores time conversion information 30 is not limited to storage 208, and time conversion information 30 may be stored in main memory 206.

User program 20 includes a time management program 26 for managing time handled by function unit 200 and a security program 24 for security monitoring processing. Time management program 26 includes a counter synchronization program 23 for synchronizing the counters between units, and a correction program 25 for correcting the counter value when executed. Further, security program 24 performs, when executed, the security monitoring processing based on security settings including a rule and the like predefined by an operator, an administrator, or the like of control device 2 to collect process variables based on a result of the processing and store the process variables into storage area 21 as time-series data. When correction program 25 is executed, correction processing, which will be described later, is performed on the counter value.

Inter-unit interface 210 connects to data bus 111. Inter-unit interface 210 exchanges data with CPU unit 100 or another function unit 200 over data bus 111.

Inter-unit interface 210 includes a data communication circuit 211 including a controller (denoted as Tx/Rx CTRL in FIG. 6) for transmitting and receiving data to and from CPU unit 100 or another function unit 200 and a buffer, and counter 213.

Network interface 220 includes a controller (denoted as Tx/Rx CTRL in FIG. 6) 222 and a buffer 226 for exchanging data over network 11.

The buffers provided in inter-unit interface 210 and network interface 220 each correspond to a storage unit that temporarily stores data to be transmitted, received data, and the like. Counter 213 is the same in configuration as counter 126 (see FIG. 5) provided in CPU unit 100.

Network interface 220 and inter-unit interface 210 of function unit 200 may each include, for example, a network interface card (NIC). FIG. 6 illustrates the configuration example where processor 202 executes a program to perform necessary processing, but some or all of the processing thus provided may be implemented by a dedicated hardware circuit (for example, an ASIC or an FPGA).

d3. Configuration of Function Unit 300

Figure 7:
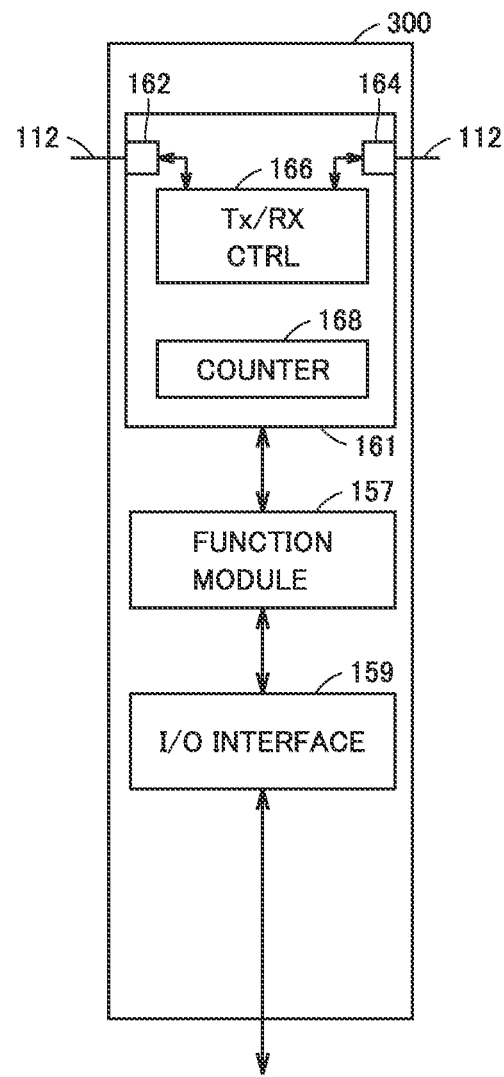
FIG. 7 is a block diagram illustrating an example of a hardware configuration of a function unit 300 provided in control device 2 according to the present embodiment.

FIG. 7 is a block diagram illustrating an example of a hardware configuration of function unit 300 provided in control device 2 according to the present embodiment. Referring to FIG. 7, function unit 300 provides various functions necessary for enabling control system 1 to control various machines, facilities, and the like. More specifically, each function unit 300 includes a function module 157, an input/output (I/O) interface 159, and a communication circuit 161.

Function module 157 is a module that performs main processing of each function unit 300 and is responsible for collecting field information from the control target such as a machine or a facility and outputting an instruction signal to the control target such as a machine or a facility.

I/O interface 159 is a circuit serving as an interface for exchanging signals with the control target such as a machine or a facility.

Communication circuit 161 is responsible for processing data sequentially transferred over data bus 112. That is, upon receipt of any data over data bus 112, communication circuit 161 processes the data thus received and then transmits the communication data to next function unit 300 on data bus 112. Communication circuit 161 provides a function of relaying such data.

More specifically, communication circuit 161 includes transmission/reception ports 162, 164, a controller for transmission/reception (denoted as Tx/Rx CTRL in FIG. 7) 166, and a counter 168.

Transmission/reception ports 162, 164 are ports physically connected to data bus 112 and are responsible for sequential transfer of data by performing processing such as reception and reproduction of data transmitted over data bus 112 in accordance with an instruction from controller 166.

Controller 166 reads data transferred over data bus 112 and performs data processing such as manipulation of data.

Counter 168 generates a clock serving as a reference of timing at which controller 166 outputs an instruction or function module 157 performs processing. To counter 168, for example, a counter based on a real-time clock is applicable, but according to the present embodiment, a free-run counter that counts up (increments) at predetermined intervals is applicable.

d4. Example of Software Configuration of CPU Unit 100

Next, an example of a software configuration of CPU unit 100 that is a part of control system 1 according to the present embodiment will be described.

Figure 8:
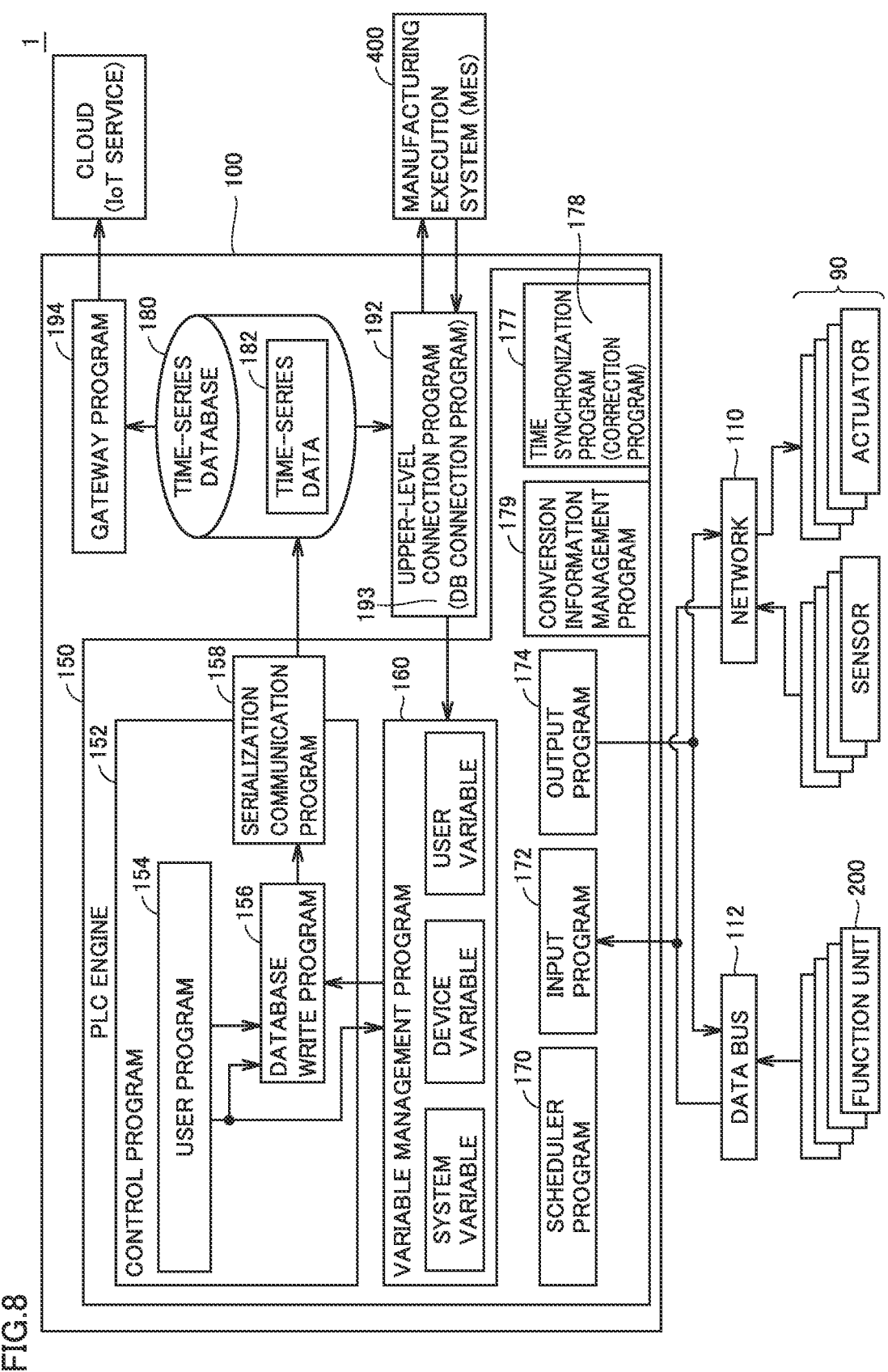
FIG. 8 is a block diagram illustrating an example of a software configuration of CPU unit 100 according to the present embodiment.

FIG. 8 is a block diagram illustrating an example of the software configuration of CPU unit 100 according to the present embodiment. Referring to FIG. 8, CPU unit 100 includes a PLC engine 150, a time-series database 180, an upper-level connection program 192, and a gateway program 194.

PLC engine 150 executes various programs under a runtime environment of the various programs. Typically, processor 102 of CPU unit 100 read the system program stored in secondary storage device 108, loads the system program into primary storage device 106, and executes the system program to provide such a runtime environment.

More specifically, PLC engine 150 includes a control program 152, a variable management program 160, a scheduler program 170, an input program 172, an output program 174, a time synchronization program 177, and a conversion information management program 179. Variable management program 160, scheduler program 170, input program 172, and output program 174 may be implemented as part of the system program. In this case, each function provided by such programs may be provided by the monolithic system program.

Control program 152 typically includes a user program 154, a database write program 156, and a serialization communication program 158. User program 154 corresponds to a main part that provides a control operation function and may be configured, as desired, to adapt to the control target of CPU unit 100 such as a manufacturing device or a facility. User program 154 may be defined by, for example, a ladder logic using function blocks or the like.

Database write program 156 is invoked by an instruction defined in user program 154 to write designated data to time-series database 180.

Serialization communication program 158 performs serialization processing on data to be written by database write program 156 to time-series database 180. More specifically, serialization communication program 158 performs processing (serialization) of converting the time-series data into a byte sequence that can be stored. Target data is converted into a predetermined byte sequence by the serialization processing and then stored in time-series database 180. Note that whether the serialization processing needs to be performed depends on the throughput of data write to time-series database 180, the data size, or the like. That is, serialization communication program 158 is optional.

Variable management program 160 manages values available to PLC engine 150 in the form of variables. More specifically, variable management program 160 manages a system variable indicating a state of CPU unit 100 or the like, a device variable indicating a value held by various devices connected to CPU unit 100 over the local bus or the field bus, and a user variable indicating a value held by user program 154 executed by CPU unit 100.

Input program 172 provides a function of acquiring input data from various devices connected to CPU unit 100 over the local bus or the field bus.

Output program 174 outputs a manipulated variable (output data) calculated by user program 154 executed by CPU unit 100 to the target device connected over data bus 112 or network 110.

Time synchronization program 177 is responsible for providing execution timing of the control program in CPU unit 100, and causing function unit 200 connected to data bus 112, and field machine 90 connected to network 110 to be time-synchronized with each other. Time synchronization program 177 includes a correction program 178 for correcting, as needed, a timer managed for time synchronization. When correction program 178 is executed, correction processing, which will be described later, is performed.

Conversion information management program 179 is responsible for management of conversion information on conversion for calculating time from the value of the counter. The management of the conversion information made by conversion information management program 179 includes sharing of the conversion information between the units. The sharing of the conversion information is made by distribution of time conversion information 30 to another unit.

Scheduler program 170 manages resource allocation, execution timing, and the like for a process, a task, or the like of CPU unit 100. Such a process or task includes a process or task that may be created by control program 152, variable management program 160, input program 172, output program 174, time synchronization program 177, conversion information management program 179, and the like running on CPU unit 100.

Time-series database 180 is typically deployed in primary storage device 106 or secondary storage device 108 and has a function of storing data and a function of retrieving designated data in response to a request (query) from the outside. Time-series database 180 stores time-series data 182 written by database write program 156. That is, time-series database 180 stores at least some of input data, output data, operation data calculated through the control operation performed by control program 152, manufacturing data, or event data in chronological order. Such input data and output data include data received by CPU unit 100 from function unit 300 and data transmitted by CPU unit 100 to function unit 300. Further, the event data may include data on security monitoring received by CPU unit 100 from function unit 200.

Upper-level connection program 192 exchanges data with an external device connected to upper-level network 13 such as manufacturing execution system 400. CPU unit 100 according to the present embodiment can output input data or operation data to manufacturing execution system 400 and receive manufacturing information from manufacturing execution system 400. As described above, upper-level connection program 192 provides a manufacturing data acquisition function of acquiring manufacturing data from manufacturing execution system 400 associated with the control target.

According to the present embodiment, manufacturing execution system 400 includes time-series DB 450. In this case, a database connection program 193 (database is denoted as "DB" in FIG. 8) may be provided instead of upper-level connection program 192 or as a part of upper-level connection program 192. For example, database connection program 193 may perform processing of transmitting a query such as SQL to a relational database and receiving a response from the relational database. The execution of database connection program 193 allows time-series data 182 of time-series database 180 in CPU unit 100 to be transferred to manufacturing execution system 400 and stored in time-series DB 450. Details of the time-series data output to manufacturing execution system 400 by database connection program 193 will be described later.

Gateway program 194 communicates with a device on the cloud. For example, time-series data 182 of time-series database 180 is provided to a device that provides an IoT service on the cloud. Specifically, gateway program 194 acquires data of a designated type from time-series database 180 at designated intervals, and outputs the data as time-series data. The time-series data output to the IoT service providing device by gateway program 194 may be the same in structure as, for example, the time-series data output to manufacturing execution system 400 by database connection program 193.

Input program 172 of CPU unit 100 acquires input data from field machine 90 such as a sensor over data buses 111, 112 and/or network 110.

Upper-level connection program 192 of CPU unit 100 acquires manufacturing data from manufacturing execution system 400. Variable management program 160 manages the input data and manufacturing data thus acquired as variables.

User program 154 performs a control operation designated in advance while referring to the system variable, the device variable, and the user variable managed by variable management program 160, and outputs a result of the control operation (output data) to variable management program 160.

Output program 174 outputs output data calculated through the control operation performed by user program 154 to field machine 90 such as an actuator over data bus 112 and/or network 110 as a control output.

Database write program 156 writes, to time-series database 180, a process variable designated from among the variables managed by variable management program 160.

Upper-level connection program 192 outputs a value of a variable designated from among the variables managed by variable management program 160 and/or data designated from among time-series data 182 stored in time-series database 180 to manufacturing execution system 400 as time-series data.

Gateway program 194 outputs the value of the variable designated from among the variables managed by variable management program 160 and/or the data designated from among time-series data 182 stored in time-series database 180 to the IoT service as time-series data. The IoT service providing device performs behavior analysis based on, for example, time-series data output from CPU unit 100 to provide a predictive maintenance service or the like for the control target such as a facility or a device.

E. Configuration for Time Synchronization

First, control device 2 according to the present embodiment has a function of synchronizing times and a function of synchronizing counters (hereinafter, also referred to as "time synchronization" and "counter synchronization", respectively).

Herein, the "time" represents a certain point in time and is measured in hours, minutes, and seconds. The "counter" includes a value for controlling timing in control device 2 and a related device, and basically indicates a value incremented or decremented by a predetermined value every predetermined unit time (hereinafter, the value indicated by the counter is also referred to as a "counter value"). According to the present embodiment, the counter value corresponds to, but not limited to, the value of a timer and represents, but not limited to, a 64-bit integer value that can represent a value in the order of nanoseconds.

According to the present embodiment, time synchronization using the counter value is applied to time synchronization between the units making up control device 2 and between each unit and other devices including field machine 90.

Referring again to FIG. 9, a configuration for each control device 2 to receive (acquire), over network 11, the counter value of the master clock that is the reference clock that manages the actual time and a configuration for making time synchronization in response to time synchronization signal 130 serving as a trigger will be described. In FIG. 9, time synchronization signal 130 is generated by signal generator 205, illustrated in FIG. 6, of function unit 200 and transmitted over signal line 113.

Such a configuration for making time synchronization may include, for example, a case where data communications in accordance with Time-Sensitive Networking (TSN) are performed over network 11 or a case where data communications in accordance with Ethernet for Control Automation Technology (EtherCAT (registered trademark)) are performed over network 11. Note that the standard applied to network 11 is not limited to TSN and EtherCAT, and may be, for example, IEEE1588.

Referring to FIG. 9, master clock 191A that manages time is provided by, for example, device/line management device 190 on network 11. Master clock 191A indicates the absolute time (actual time) managed by, for example, a time synchronization server provided on the Internet. Master clock 191A may be used as a reference clock for counter synchronization, and master clock 191A serving as the reference clock may be provided in another device on network 11.

CPU unit 100 includes synchronization processing unit 114 implemented through execution of time synchronization program 177. Synchronization processing unit 114 communicates with device/line management device 190 via upper-level network controller 105 to refer to master clock 191A. Synchronization processing unit 114 corrects a transmission delay on network 11 or the like when acquiring the time of master clock 191A using the function of device/line management device 190 serving as the time synchronization server. This allows synchronization processing unit 114 to acquire a more accurate time from master clock 191A. When acquiring the time using the time synchronization protocol, synchronization processing unit 114 latches the counter value of counter 126 at the timing of execution of the time synchronization protocol. This causes the time acquired from master clock 191A and the counter value to be associated with each other. Such an association becomes "time conversion information 30". Maintaining the association corresponds to synchronization between master clock 191A and CPU unit 100. Further, in order to maintain this association, update of "time conversion information 30", update of the time in the unit (the time of RTC 128), and correction of the counter may be performed.

Function unit 200 includes synchronization processing unit 216 implemented through execution of counter synchronization program 23. Synchronization processing unit 216 of function unit 200 receives the counter value of counter 126 from CPU unit 100 over data bus 111 at startup and sets counter 213 to the counter value thus received, for example. Subsequently, synchronization processing unit 216 periodically updates (increment or decrement) the counter value of counter 213 in synchronization with the output from the internal hardware circuit, and sets control counter 213 to the updated value. This causes the counter value of counter 213 to be periodically updated.

More specifically, in CPU unit 100, scheduler program 170 performs scheduling of control program 152 and the like based on control counter 126. Further, input program 172 and output program 174 are time-synchronized with each device based on counter 119 and counter 124 synchronized with counter 126. This allows scheduling of control program 152 and the like and time synchronization between each device connected to control device 2 and control device 2 in CPU unit 100 to be performed based on master clock 191A. This in turn allows scheduling of the control program and the like and input/output between each device (for example, field machine 90) connected to control device 2 and control device 2 in CPU unit 100 to be performed in synchronization with master clock 191A.

e1. Counter Adjustment Processing by Synchronization Processing Unit

According to the present embodiment, the counter value of counter 126 is updated in synchronization with the output signal of the internal hardware circuit of CPU unit 100, for example. This may cause a difference between the counter value of counter 213 of function unit 200 and the counter value of counter 126 of CPU unit 100 (hereinafter, also referred to as a synchronization mismatch) to increase due to an error in the hardware circuit or the like. An increase in the synchronization mismatch prevents scheduling of the control program and input/output between each device connected to control device 2 and control device 2 in CPU unit 100 from being performed in synchronization with master clock 191A. Note that the cause of the difference is not limited to an error in the hardware circuit or the like.

In order to prevent such a case, synchronization processing unit 216 of function unit 200 and synchronization processing unit 114 of CPU unit 100 perform correction processing for reducing the synchronization mismatch. This correction processing is performed by correction program 178 executed by synchronization processing unit 114 or correction program 25 executed by synchronization processing unit 216. Synchronization processing unit 114 and synchronization processing unit 216 perform the correction processing including the latch processing in response to time synchronization signal 130 on signal line 113 serving as a trigger.

In the latch processing, upon receipt (input) of time synchronization signal 130, synchronization processing unit 114 and synchronization processing unit 216 each latch (acquire) a corresponding one the counter values of counter 126 and counter 213, and stores the counter value thus latched into a predetermined storage area. Subsequently, synchronization processing unit 114 and synchronization processing unit 216 exchange the latched counter values with each other over data bus 111 for comparison, calculate a difference (hereinafter, also referred to as a synchronization mismatch) between the counter values based on the comparison result, and adjust the counter value of a corresponding counter using an adjustment value based on the difference thus calculated so as to make the difference smaller. This adjustment includes, for example, correction processing of adding or subtracting the adjustment value to or from the counter value.

Further, the adjustment for the synchronization mismatch may be performed upon receipt of time synchronization signal 130 or after a lapse of a predetermined time from the reception of time synchronization signal 130.

Further, the transmission source unit of time synchronization signal 130 is not limited to function unit 200, and may be another unit provided in control system 1. According to the present embodiment, time synchronization signal 130 is periodically output, for example, every 1 msec, but is not limited to such periodical output. For example, function unit 200 may output time synchronization signal 130 when the counter value of counter 213 becomes equal to a certain specified value.

e2. Switching of Clock Providing Actual Time

According to the above-described embodiment, master clock 191A is used as the reference clock for counter synchronization, but the reference clock for time synchronization may be switched.

Specifically, synchronization processing unit 114 (or synchronization processing unit 216) determines whether accuracy of time received from master clock 191A (for example, the order of milliseconds, the order of microseconds, or the like) satisfies a predetermined condition. Note that an index of the accuracy of time is not limited to the order of milliseconds, the order of microseconds, or the like. For example, the index may include information such as accuracy (such as a name) of a server serving as a supply source (timesource) of master clock 191A, a synchronization protocol, and a timezone indicated by master clock 191A. Therefore, the predetermined condition may include a condition that the value indicated by the index of the accuracy of time is a predetermined value. When a determination is made that the accuracy of the time supplied by master clock 191A satisfies the predetermined condition, the counter values of counters 126 and 213 are adjusted according to the time received from master clock 191A by the above-described time synchronization.

On the other hand, when determining that the accuracy of the time received from master clock 191A does not satisfy the predetermined condition, synchronization processing unit 114 (or synchronization processing unit 216) synchronizes counter 126 of CPU unit 100 and counter 213 of function unit 200 based on the time managed by the internal clock provided in one of CPU unit 100 and function unit 200. According to the present embodiment, RTC 128 is used as the internal clock, but when function unit 200 includes an internal clock corresponding to the RTC, the internal clock of functional unit 200 may be used as the reference clock.

According to the present embodiment, synchronization processing unit 114 (or synchronization processing unit 216) can acquire the accuracy of the time managed by master clock 191A from, for example, but not limited to, configuration information indicating the configuration of control system 1.

e3. Another Implementation Example of Time Synchronization

Referring to FIG. 9, control system 1 may further include a unit 370 different from CPU unit 100 and function unit 200, and cause unit 370 to perform the above-described time synchronization processing.

Unit 370 may be connected to signal line 113 and data bus 111. Unit 370 includes a hardware processor, and the hardware processor executes a program to synchronize counter 126 of CPU unit 100 and counter 213 of function unit 200. Specifically, when detecting time synchronization signal 130 on signal line 113, unit 370 reads the counter values from counter 126 and counter 213 over data bus 111. Unit 370 corrects the count values of counters 126 and 213 so as to make the synchronization mismatch smaller using the counter values thus read as described above. Unit 370 sets each counter to a corresponding one of the counter values thus corrected over data bus 111.

As described above, each control device 2 uses the time of master clock 191A to achieve (i) time synchronization between units, (ii) time synchronization between each unit and a device connected to the unit, and (iii) time synchronization for execution of control program 152, input program 172, and output program 174 by scheduler program 170 in CPU unit 100. Furthermore, each control device 2 performs time synchronization using common master clock 191A to achieve (iv) time synchronization between different control devices 2. Further, when control device 2 is provided for each different process, time synchronization between the different processes can be performed.

F. Example of Time Conversion Information and Conversion

FIG. 10 is a diagram schematically illustrating an example of time conversion information 30 according to the present embodiment. Time conversion information 30 is information shared between units, and includes information on conversion for calculating the actual time from the value of the counter. For example, time conversion information 30 includes a conversion formula 36 and a conversion table 35 that are shared between units. According to the present embodiment, the conversion formula is shared between units by using conversion table 35 illustrated in FIG. 10.

Conversion formula 36 is, for example, currentTOD=baseTOD+(currentCount−baseCount). Conversion formula 36 is a formula for calculating the time elapsed from the reference time (baseTOD) using the control counter value (currentCount−baseCount) and adding the reference time (baseTOD) to the value thus calculated to obtain the current actual time (currentTOD).

Referring to FIG. 10, conversion table 35 includes an element description 32, a type/unit example 33, and a value example 34, each associated with a corresponding element 31 in the table. Examples of element 31 include "baseCount", "baseTOD", "timezone", and "timeSource". "baseCount" and "baseTOD" indicate operands of conversion formula 36. Specifically, "baseCount" is a reference control counter value, and indicates the counter value of counter 126 of CPU unit 100 in the present embodiment. Further, "baseTOD" is a value paired with the value of "baseCount", and indicates a TOD value that is the clock value of RTC 128 of CPU unit 100 in the present embodiment.

Figure 11:
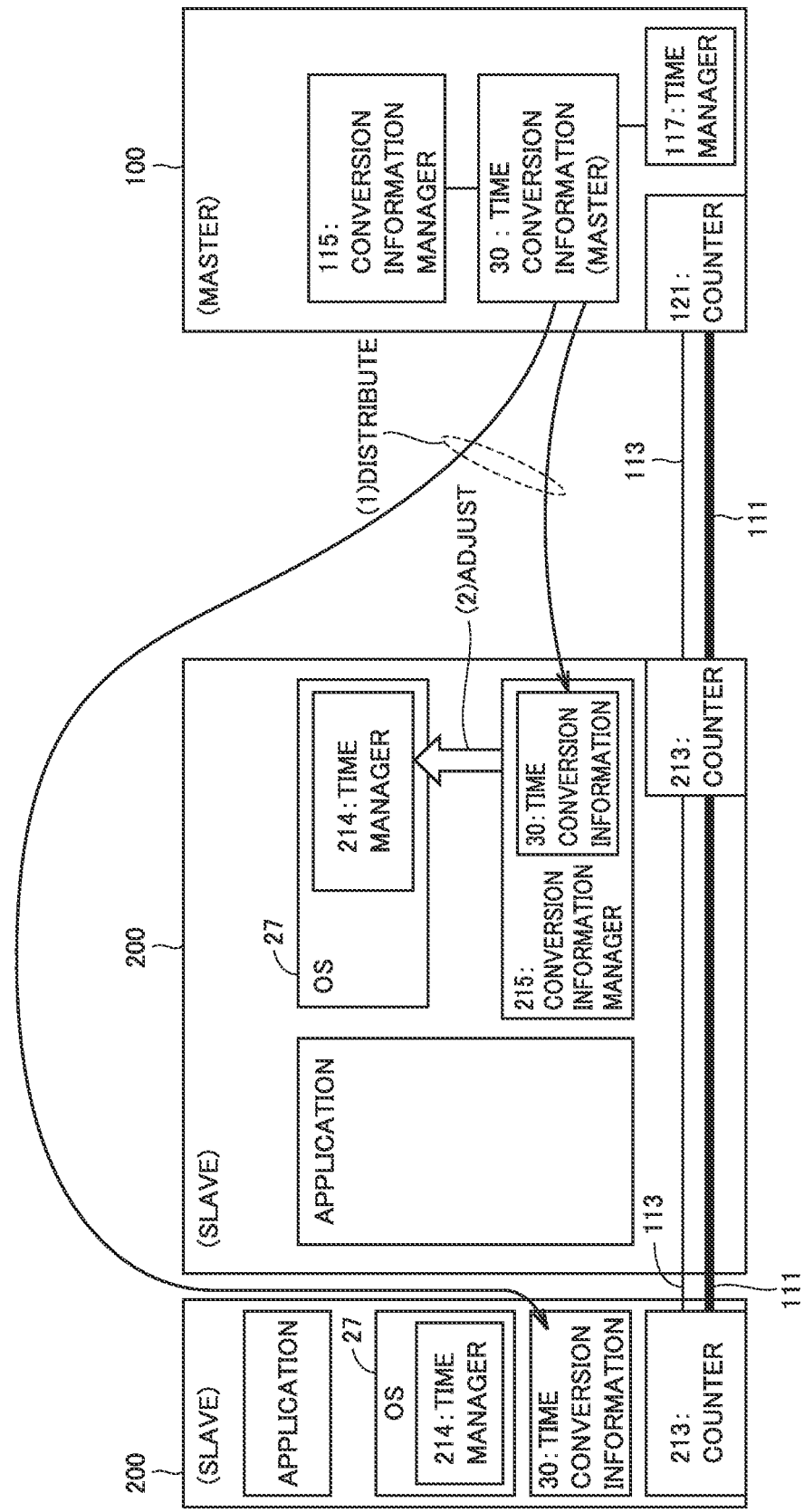
FIG. 11 is a diagram schematically illustrating an example of a configuration for sharing time conversion information 30 according to the present embodiment.

A time manager 117, illustrated in FIG. 11, of CPU unit 100 sets each of the operands (baseCount) and (baseTOD) of conversion formula 36 to the value read from a corresponding element 31 of conversion table 35, and sets the operand (currentCount) to the current counter value of control counter 126 to calculate the value of (currentTOD) indicating the current actual time from conversion formula 36. Similarly, conversion information manager 215 (to be described later) of function unit 200 sets each of the operands (baseCount) and (baseTOD) of conversion formula 36 to the value read from a corresponding element 31 of conversion table 35, and sets the operand (currentCount) to the current counter value of control counter 213 to calculate the value of (currentTOD) indicating the current actual time from conversion formula 36. Note that, for this calculation, conversion of units is performed as needed.

As an example of the conversion, with conversion table 35 and currentCount=333444555666, the current actual time is converted as follows.

currentTOD={seconds=1558436425, nanoseconds=849614166} (=May 21 20:00:25 2019 (JST)).

Note that, among elements 31 of conversion table 35, "timezone" and "timeSource" are examples of information on the accuracy of time managed by the clock used for counter synchronization, and may be treated as option information for the conversion.

G. Sharing of Time Conversion Information 30

According to the present embodiment, for example, the master (for example, CPU unit 100) distributes time conversion information 30 to the slaves (for example, function units 200) so as to cause time conversion information 30 to be shared between the units.

FIG. 11 is a diagram schematically illustrating an example of a configuration for sharing time conversion information 30 according to the present embodiment. In FIG. 11, for example, two slaves (function units 200) are connected to the master (CPU unit 100). Note that the slaves connected to the master are one or more in number.

Conversion information manager 115 of the master distributes (transmits) time conversion information 30 stored in secondary storage device 108 to each slave (corresponding to (1) distribution in FIG. 11). This distribution is performed over, for example, data bus 111. The slave includes conversion information manager 215 implemented through execution of time management program 26. Conversion information manager 215 receives time conversion information 30 transmitted from the master, stores time conversion information 30 into storage 208, and calculates the above-described current time (currentTOD) using time conversion information 30. Further, conversion information manager 215 adjusts the current time managed by time manager 214 included in OS 27 to the current time thus calculated (corresponding to (2) adjustment in FIG. 11). This allows each slave to update the current time managed by OS 27 to the current time (currentTOD) calculated from time conversion information 30 shared between the units and in turn allows the current times managed by the units to be synchronized between the units.

Note that, when function unit 200 includes an internal clock corresponding to RTC 128, and master clock 191 A is synchronized with the internal clock, the conversion information manager included in function unit 200 may serve as the master to manage time conversion information 30 and distribute time conversion information to CPU unit 100 serving as the slave.

g1. Another Example of Sharing of Time Conversion Information 30

Figure 12:
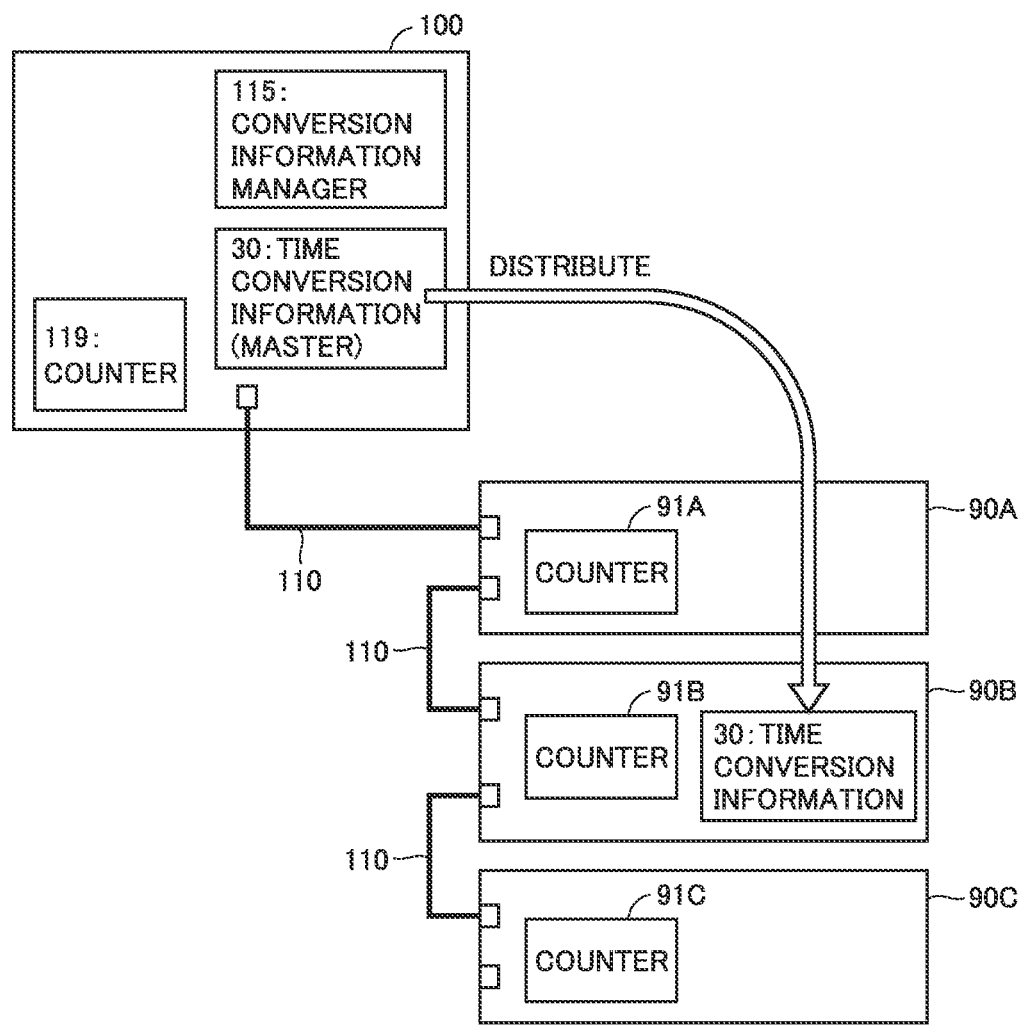
FIG. 12 is a diagram schematically illustrating another example of the configuration for sharing time conversion information 30 according to the present embodiment.

According to the present embodiment, for example, the slave to which time conversion information 30 is distributed by the master to cause time conversion information 30 to be shared between units is not limited to function unit 200. Such a slaves may include, for example, function unit 300 or field machine 90. FIG. 12 is a diagram schematically illustrating another example of the configuration for sharing time conversion information 30 according to the present embodiment.

FIG. 12 illustrates, for example, field machines 90 connected to network 110 as units that share time conversion information 30 with the master.

CPU unit 100 is time-synchronized with field machines 90A, 90B, and 90C connected over network 110 (for example, EtherCAT (registered trademark)). More specifically, control counter 119 of CPU unit 100 and counters 91A, 91B, and 91C of field machines 90A, 90B, and 90C are time-synchronized with each other. In FIG. 12, time conversion information 30 is distributed from the master to field machine 90B, but may be distributed to another field machine.

Note that, in the case illustrated in FIG. 12, "baseCount" and "baseTOD" of elements 31 of conversion table 35 to be shared correspond to a pair of a clock (for example, Distributed Clock (DC) on EtherCAT) value with which the protocol on network 110 is synchronized among the machines, and a corresponding TOD value.

As illustrated in FIG. 12, CPU unit 100 exchanges data with function unit 200 over data bus 111 and communicates with a third unit connected to network 110. The synchronization processing unit synchronizes counter 126 included in CPU unit 100 and control counter 91 included in field machine 90. In FIG. 12, as counter 126 of CPU unit 100, counter 119 time-synchronized with counter 126 is illustrated. Field machine 90 stores time conversion information 30 distributed from CPU unit 100. This allows the control counters to be synchronized among CPU unit 100, function unit 200, and field machine 90 and allows time conversion information 30 to be shared among the units.

H. Configuration for Referring to Current Time

Figure 13:
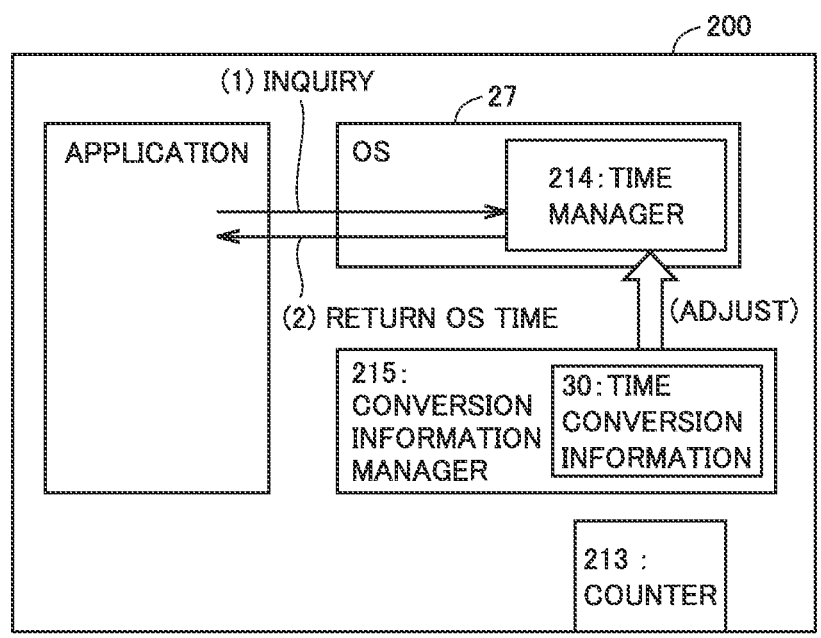
FIG. 13 is a diagram schematically illustrating a case where an application of function unit 200 according to the present embodiment refers to the current time.
Figure 14:
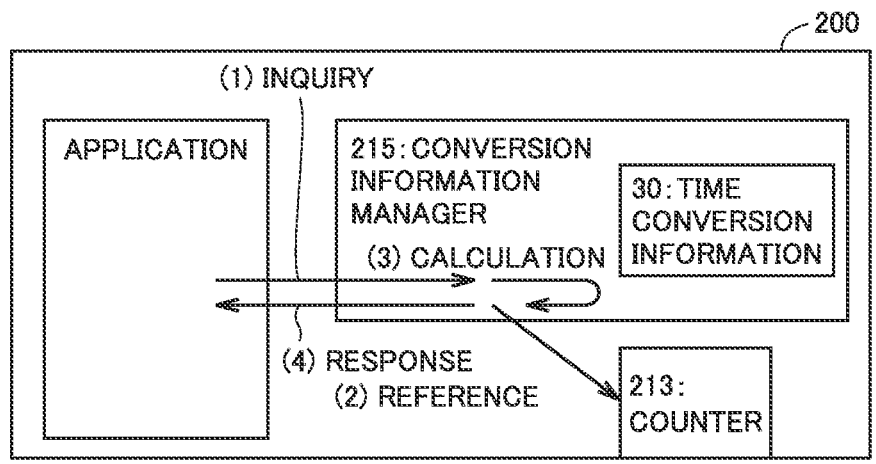
FIG. 14 is a diagram schematically illustrating a case where the application of function unit 200 according to the present embodiment refers to the current time.
Figure 15:
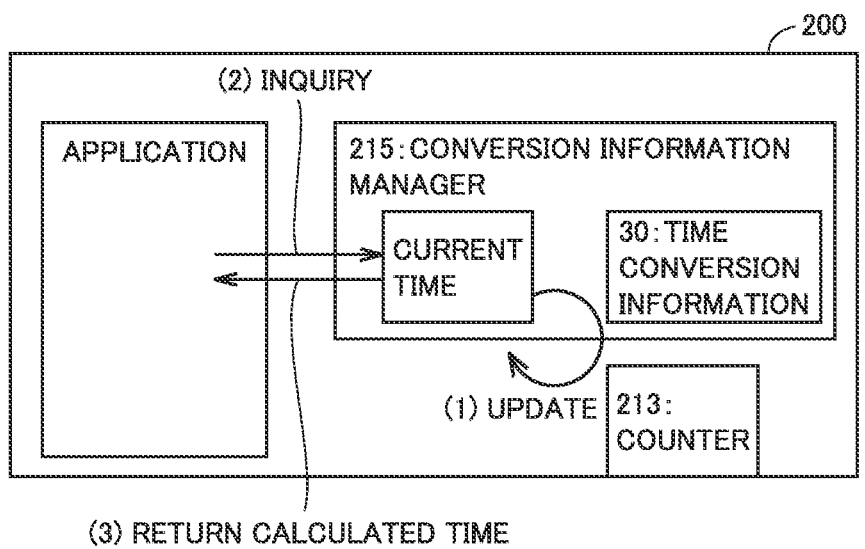
FIG. 15 is a diagram schematically illustrating a case where the application of function unit 200 according to the present embodiment refers to the current time.

FIGS. 13, 14, and 15 are diagrams schematically illustrating cases where an application of function unit 200 according to the present embodiment refers to the current time. The application of the function unit may include, but is not limited to, for example, security program 24. FIG. 13 illustrates a case where the application inquires of OS 27 about the current time, and FIGS. 14 and 15 illustrate a case where the application inquires of conversion information manager 215 about the current time.

Referring to FIG. 13, when the application inquires of OS 27 about the current time (step (1)), time manager 214 of OS 27 returns, to the application, the current time under management as a response (step (2)). In the case illustrated in FIG. 13, the existing application can acquire the current time using a general interface, that is, the current time calculated from time conversion information 30 shared among the units by conversion information manager 215.

Referring to FIG. 14, when the application inquires of conversion information manager 215 about the current time (step (1)), conversion information manager 215 refers to (reads) the current counter value from control counter 213 (step (2)), calculates the current time based on conversion table 35 and conversion formula 36 using the counter value as (currentCount) (step (3)), and returns, to the application, the current time thus calculated as a response (step (4)). In the case illustrated in FIG. 14, since the current time is calculated using the counter value (currentCount) indicated by counter 213 when conversion information manager 215 receives the inquiry, the application can acquire the current time with high accuracy.

In the case illustrated in FIG. 15, conversion information manager 215 holds the current counter value of counter 213 and the current time calculated from time conversion information 30, and updates, as needed, the current time thus held (step (1)). Upon receipt of the inquiry about the current time from the application (step (2)), conversion information manager 215 returns, to the application, the held calculated current time as a response (step (3)). In the case illustrated in FIG. 15, even when the application makes an inquiry at a high frequency, conversion information manager 215 only returns the held current time (that is, it is not necessary to calculate the current time for each inquiry), so that it is possible to avoid frequent access to the hardware (for example, counter 213) made by conversion information manager 215.

Note that each unit may provide one or more of the methods according to the cases illustrated in FIGS. 13 to 15.

Figure 16:
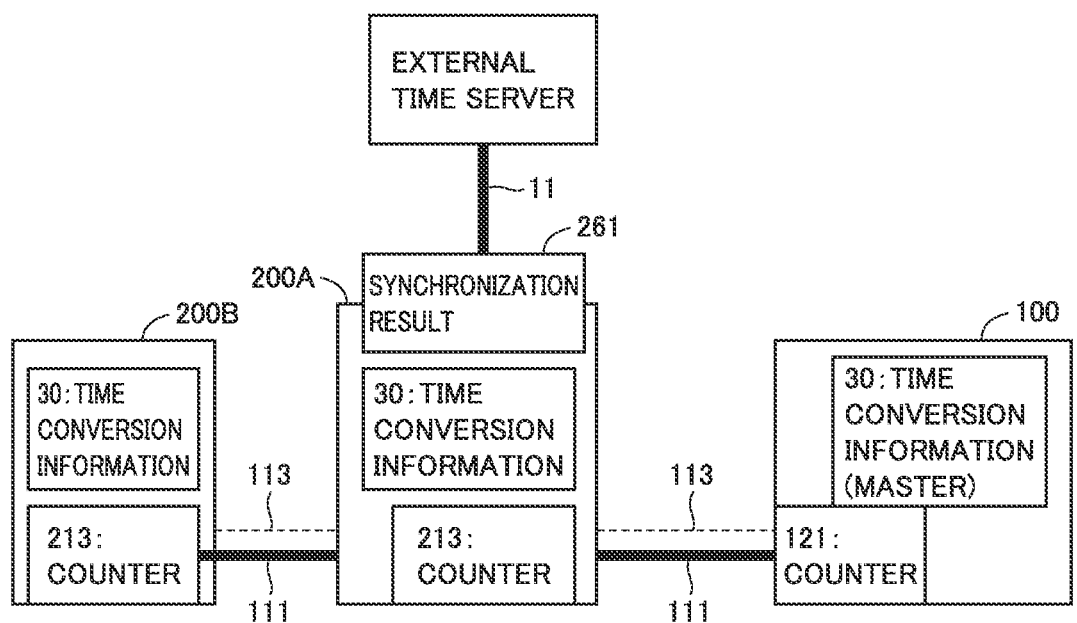
FIG. 16 is a diagram schematically illustrating a configuration where time conversion information 30 is shared in accordance with accuracy of a reference clock according to the present embodiment.
Figure 17:
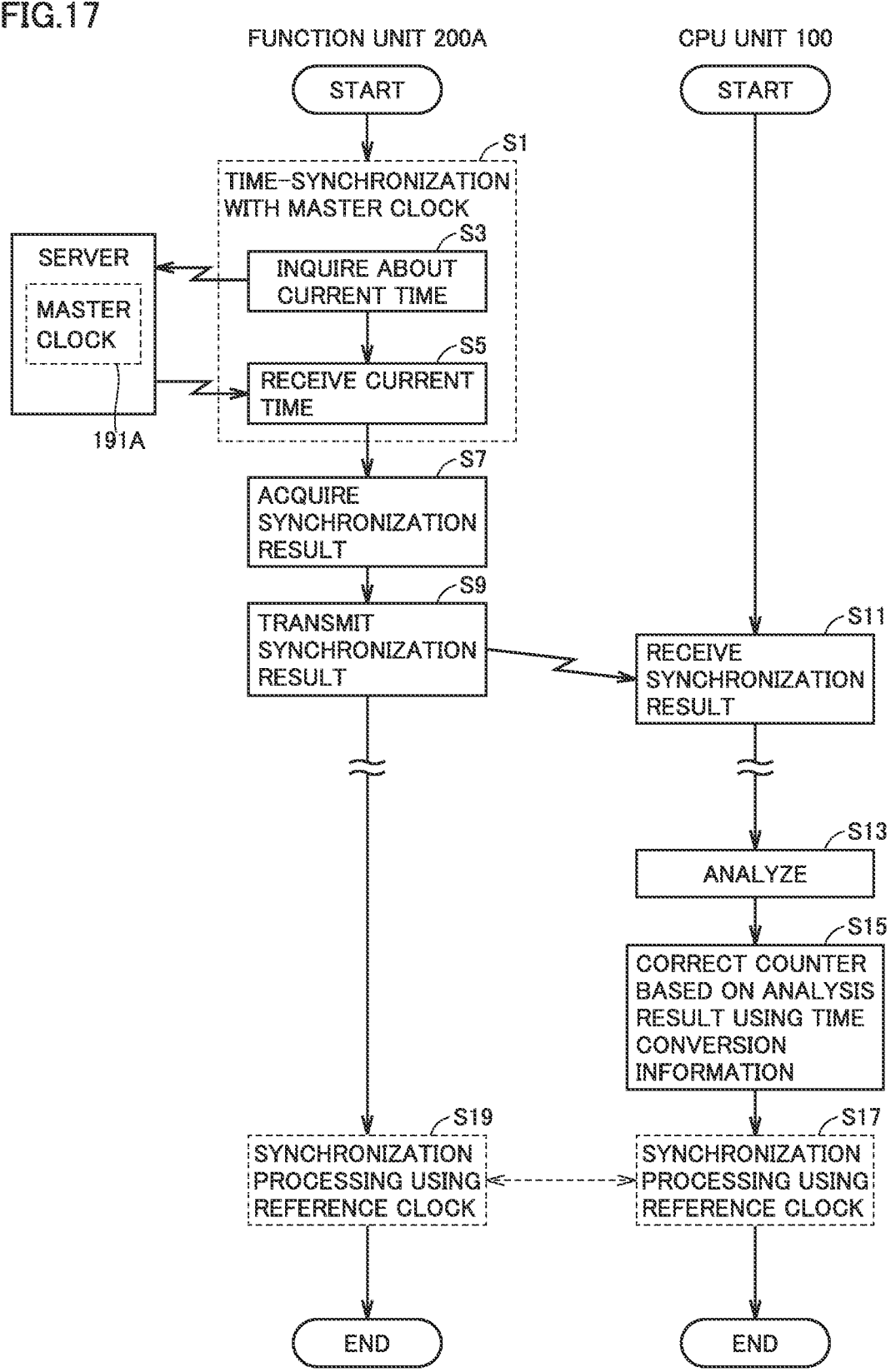
FIG. 17 is a flowchart of processing in a case where the accuracy of the reference clock according to the present embodiment satisfies a predetermined condition.
Figure 18:
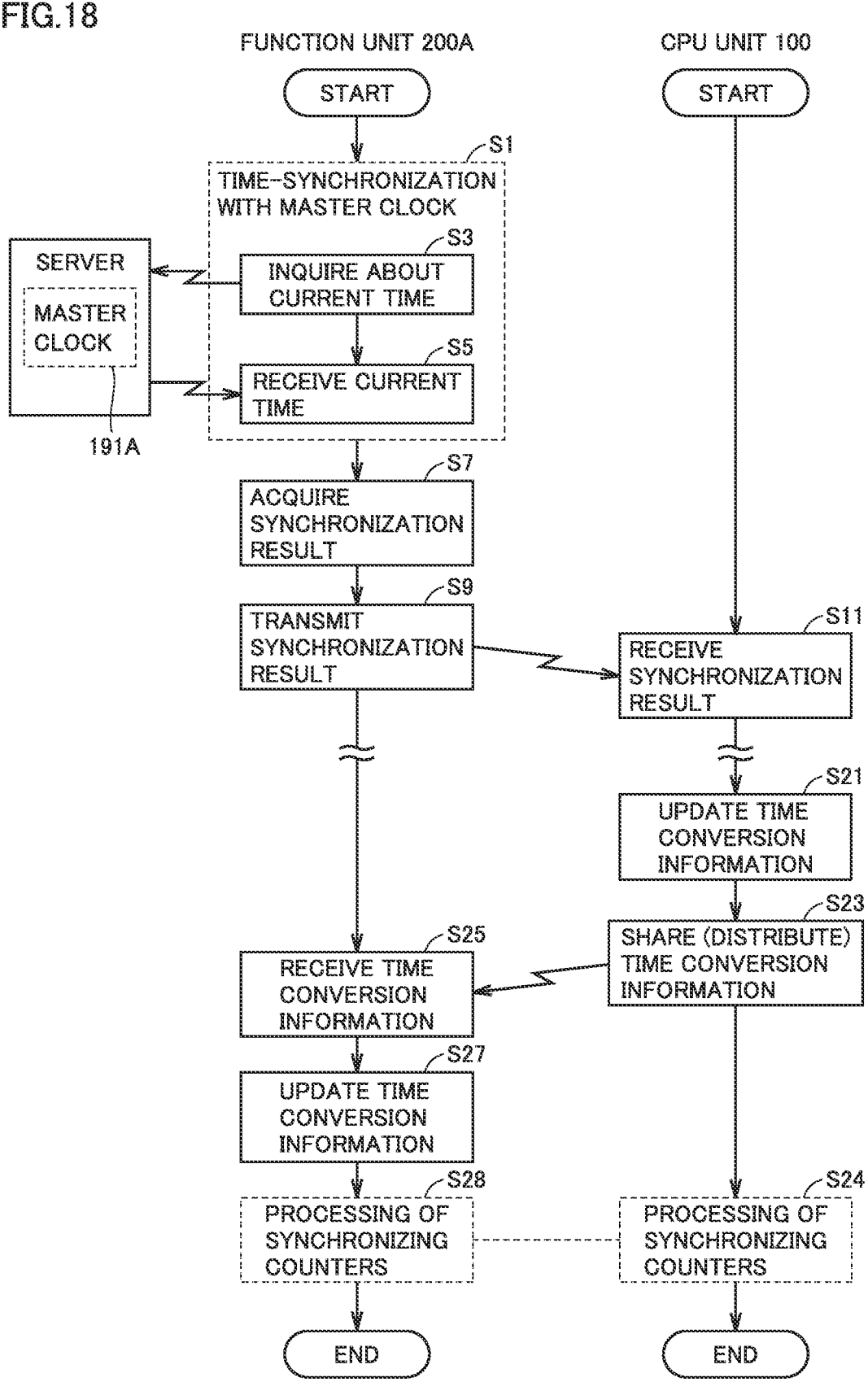
FIG. 18 is a flowchart of processing in a case where the accuracy of the reference clock according to the present embodiment does not satisfy the predetermined condition.

I. Sharing of Time Conversion Information 30 in Accordance with Accuracy of Reference Clock FIG. 16 is a diagram schematically illustrating a configuration where time conversion information 30 is shared in accordance with the accuracy of the reference clock according to the present embodiment. FIG. 16 illustrates two function units 200 connected to CPU unit 100 over data bus 111, for example. In FIG. 16, two function units 200 are distinguished as a function unit 200A and a function unit 200B, but the function units are the same in configuration as each other. In FIG. 16, of function units 200, function unit 200A communicates with an external time server that provides master clock 191A. FIG. 17 is a flowchart of processing in a case where the accuracy of the reference clock according to the present embodiment satisfies the predetermined condition. FIG. 18 is a flowchart of processing in a case where the accuracy of the reference clock according to the present embodiment does not satisfy the predetermined condition. This reference clock corresponds to, for example, master clock 191A, and master clock 191A is, for example, a grand master clock based on the TSN provided by device/line management device 190.

Referring to FIG. 17, processing in a case where the accuracy of the time managed by master clock 191A satisfies the predetermined condition will be described with reference, as needed, to FIG. 9. In this case, time conversion information 30 is unchanged. First, synchronization processing unit 216 (FIG. 9) of function unit 200A illustrated in FIG. 16 executes a time synchronization protocol between synchronization processing unit 216 and device/line management device 190 (step S1). For example, in step S1, synchronization processing unit 216 inquires about the current time (actual time) of master clock 191A (step S3), and receives the current time of master clock 191A from device/line management device 190 (step S5).

Synchronization processing unit 216 acquires a synchronization result 261 (FIG. 16) (step S7) and transmits synchronization result 261 thus acquired to CPU unit 100 (step S9). Synchronization result 261 includes (the counter value of counter 213 corresponding to the actual time of master clock 191A).

Synchronization processing unit 114 (FIG. 9) of CPU unit 100 receives synchronization result 261 from function unit 200A (step S11) and analyzes the synchronization result thus received (step S13). In the analysis, synchronization processing unit 114 compares the actual time and the counter value of synchronization result 261 with the value of "baseTOD" and the value of "baseCount" of conversion table 35, respectively, and adjusts (corrects) the counter value of counter 126 (FIG. 9) to synchronize the counter value with the lapse of the external actual time based on the comparison result (step S15). Counter 126 is set to the counter value after correction (addition or subtraction).

Specifically, synchronization processing unit 114 calculates a difference between elements 31 (baseCount, baseTOD) of currently held conversion table 35 and synchronization result 261 acquired this time for each of the time (TOD) and the counter value.

The difference between the calculated TODs and the difference between the counter values (=difference between an elapsed time on the TOD and an elapsed time on the counter) become a difference in progress (fast/slow) of control counter 126 relative to master clock 191A that is an external clock. Synchronization processing unit 114 corrects the control counter of the controller so as to eliminate the difference in progress of control counter 126 thus calculated. In the correction, subtraction or addition is performed little by little over time so as not to affect ongoing control. Note that the correction may include correction of the speed itself of control counter 126.

Subsequently, in response to time synchronization signal 130 (FIG. 9) serving as a trigger, synchronization processing unit 114 and synchronization processing unit 216 perform the time synchronization processing described above (steps S17, S19). The time synchronization processing triggered by time synchronization signal 130 is performed in the same manner between synchronization processing unit 216 of function unit 200B and synchronization processing unit 114 of CPU unit 100.

Note that the process in step S15 is not performed when the time synchronization protocol is executed for the first time after control system 1 is started. That is, time conversion information 30 including conversion formula 36 for calculating the difference is not yet stored in each unit. In this case, CPU unit 100 updates time conversion information 30 including conversion formula 36 using synchronization result 261 and distributes time conversion information 30 thus updated to the unit group to cause time conversion information 30 to be shared among the units.

In FIG. 17, correcting control counter 126 of CPU unit 100 using synchronization result 261, that is, synchronizing counter 126 with master clock 191A allows the control counter of each unit to be synchronized with master clock 191A. The process in step S1 is periodically performed, so that the control counter of each unit can be accurately synchronized with master clock 191A (synchronization mismatch can be reduced). Control system 1 can acquire the actual time from the external high-precision clock (master clock 191A) and synchronize the time of the entire system and the control counter to synchronize with the actual time.

On the other hand, in processing illustrated in FIG. 18, the correction of control counter 126 using synchronization result 261 is not performed, and conversion information manager 115 (FIG. 9) updates (changes) conversion table 35 based on synchronization result 261.

Referring to FIG. 18, processing in a case where the accuracy of the time managed by master clock 191A does not satisfy the predetermined condition will be described with reference, as needed, to FIG. 9. In this case, time conversion information 30 is updated in accordance with synchronization result 261. First, synchronization processing unit 216 (FIG. 9) of function unit 200A illustrated in FIG. 16 executes the time synchronization protocol between synchronization processing unit 216 and device/line management device 190 (steps S1, S3, S5). Synchronization processing unit 216 acquires a synchronization result 261 (FIG. 16) (step S7) and transmits synchronization result 261 thus acquired to CPU unit 100 (step S9). Synchronization processing unit 114 (FIG. 9) of CPU unit 100 receives synchronization result 261 from function unit 200A (step S11).

Conversion information manager 115 updates time conversion information 30 based on synchronization result 261 thus received (step S21), and transmits (distributes) time conversion information 30 thus updated to function unit 200A (step S23). Conversion information manager 215 of function unit 200 receives time conversion information 30 (step S25), and updates (overwrites) original time conversion information 30 in storage 208 with updated time conversion information 30 thus received (step S27).

Then, synchronization processing unit 114 and synchronization processing unit 216 synchronize counter 126 of CPU unit 100 and counter 213 of function unit 200 (steps S24, S28).

In step S21 described above, conversion information manager 115 analyzes synchronization result 261, updates conversion table 35 based on the analysis result, and updates the current time of RTC 128. This update is repeatedly performed (performed over time) using, for example, a small adjustment amount, so that a large change in time does not occur. Here, when synchronization result 261 includes only time, conversion information manager 115 changes synchronization result 261 to (time, counter value corresponding to the time) using the current counter value of counter 126. Conversion information manager 115 sets the time indicated by synchronization result 261 and the counter value corresponding to the time as "baseTOD" and "baseCount", respectively, into conversion table 35 to update conversion table 35.

Note that, in FIG. 18, the counter synchronization processing is performed after the distribution of time conversion information 30, but the timing at which the synchronization processing is performed is not limited to the timing after the distribution of time conversion information 30. The processing relating to the update and sharing of time conversion information 30 (steps S23, S25, S27) and the time synchronization processing (steps S24, S28) triggered by time synchronization signal 130 are performed in the same manner between function unit 200B and CPU unit 100.

In FIG. 18, RTC 128 of CPU unit 100 is synchronized with the time of master clock 191A using synchronization result 261, that is, counter 126 is synchronized with master clock 191A. Accordingly, the time conversion processing using time conversion information 30 in each unit allows the time acquired from master clock 191A to be shared between the units.

Note that function unit 200B can communicate with an external server including master clock 191, and in this case, processing the same as the processing (FIGS. 17 and 18) performed in function unit 200A can also be performed in function unit 200B.

J. Processing on Time-Series Data

Figure 19:
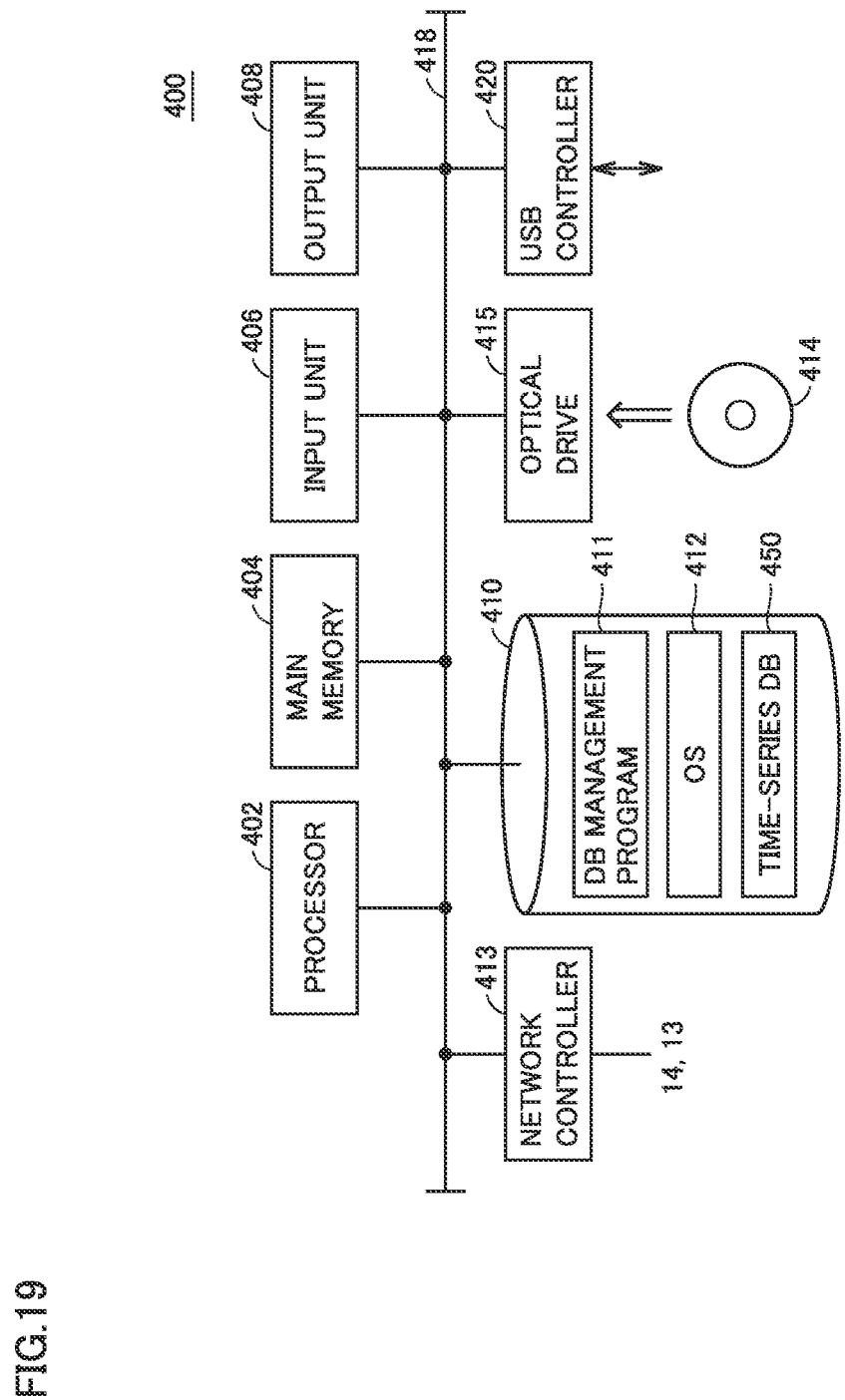
FIG. 19 is a diagram illustrating an example of a configuration of a manufacturing execution system 400 according to the present embodiment.

FIG. 19 is a diagram illustrating an example of a configuration of manufacturing execution system 400 according to the present embodiment. As an example, manufacturing execution system 400 is implemented by hardware (for example, a general-purpose personal computer) adhering to a standard architecture.

Referring to FIG. 19, manufacturing execution system 400 includes a processor 402, a main memory 404, an input unit 406, an output unit 408, a storage 410, an optical drive 415, a USB controller 420 for establishing communications with an external device, and a network interface 413 that connects to networks 13, 14. Such components are connected over a processor bus 418.

Processor 402 includes a CPU, a GPU, or the like, and reads a program stored in storage 410, deploys the program into main memory 404, and executes the program to perform various processing as described later.

Main memory 404 includes a volatile storage device such as a DRAM or an SRAM. Storage 410 includes, for example, a non-volatile storage device such as an HDD or an SSD.

Storage 410 stores various programs for providing functions corresponding to manufacturing execution system 400 in addition to an OS 412 for implementing a basic function. The various programs include a DB management program 411. Further, storage 410 has an area where time-series DB 450 is stored.

Input unit 406 includes a keyboard, a mouse, and the like, and receives a user operation on manufacturing execution system 400. Output unit 408 includes a display, various indicators, a printer, and the like, and outputs a processing result and the like received from processor 402.

Manufacturing execution system 400 includes optical drive 415 so as to allow a computer-readable program stored in a non-transitory recording medium 414 (for example, an optical recording medium such as a digital versatile disc (DVD)) to be read from the recording medium and installed in storage 410 or the like.

FIG. 19 illustrates a configuration example where processor 402 executes a program to provide functions necessary for manufacturing execution system 400, but some or all of the functions thus provided may be implemented by a dedicated hardware circuit (for example, an ASIC or an FPGA).

Figure 20:
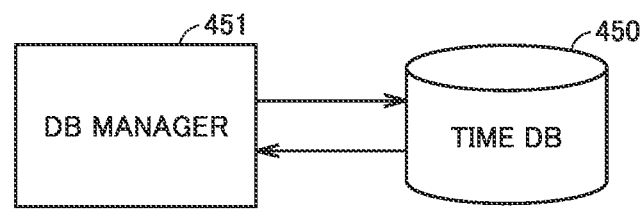
FIG. 20 is a diagram illustrating a DB manager provided through execution of a DB management program 411 illustrated in FIG. 19.

FIG. 20 is a diagram illustrating a DB manager provided through execution of DB management program 411 illustrated in FIG. 19. Referring to FIG. 20, DB manager 451 provided through the execution of DB management program 411 by processor 402 manages time-series DB 450 (for example, generation, integration, edit, analysis, or output of DB).

J1. Time Synchronization for Process Variable

Figure 21:
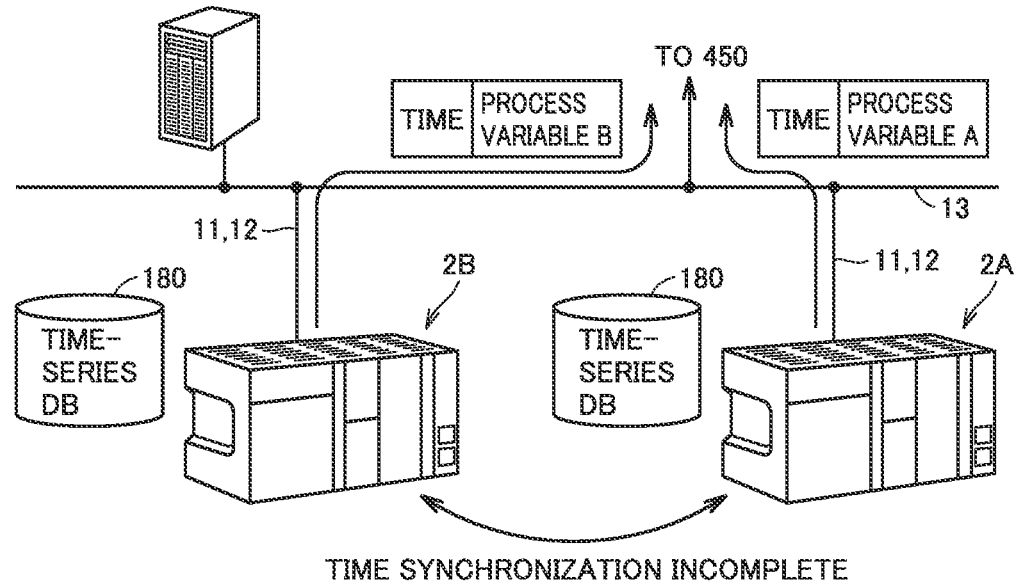
FIG. 21 is a diagram schematically illustrating an example of processing in a case where control device 2 according to the present embodiment transmits time-series data to manufacturing execution system 400.
Figure 22:
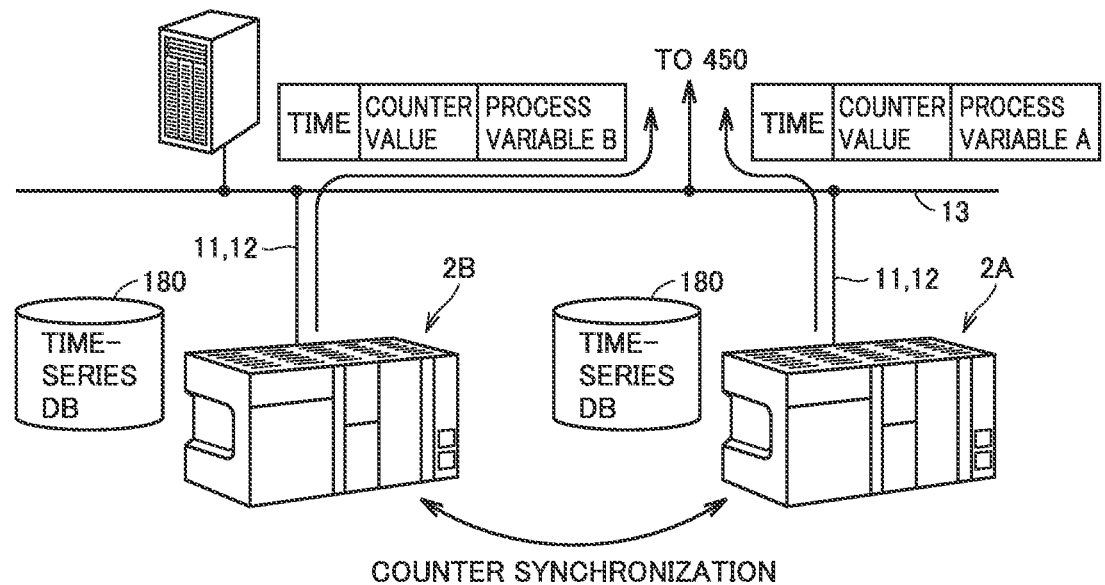
FIG. 22 is a diagram schematically illustrating an example of the processing in the case where control device 2 according to the present embodiment transmits time-series data to manufacturing execution system 400.

FIGS. 21 and 22 are diagrams schematically illustrating examples of the processing in a case where control device 2 according to the present embodiment transmits time-series data to manufacturing execution system 400. FIG. 21 illustrates a case where the time synchronization processing is not performed, and FIG. 22 illustrates a case where the time synchronization processing is performed. FIGS. 23 and 24 are diagrams schematically illustrating frames of time-series data created by control device 2 according to the present embodiment. FIG. 25 is a diagram schematically illustrating an example of time-series DB 450 according to the present embodiment.

FIG. 21 illustrates a configuration where control devices 2A, 2B are connected to manufacturing execution system 400 over upper-level network 13. In the configuration illustrated in FIG. 21, control device 2A and control device 2B are not time-synchronized with each other.

Each pieces of time-series data includes process variables collected by control devices 2A, 2B and a time associated with each process variable. Paradoxically speaking, in the configuration illustrated in FIG. 21, control devices 2A, 2B can only add a time as information indicating the collection timing of each process variable. Control devices 2A, 2B individually manage times, thereby making time synchronization incomplete.

As a result, since the times are not exactly synchronized with each other among the pieces of time-series data collected by manufacturing execution system 400, DB manager 451 cannot compile (that is, integrate) the pieces of time-series data with their respective timings exactly matched with each other.

On the other hand, in the configuration illustrated in FIG. 22, control device 2A and control device 2B include the time-synchronized counters described above and the time obtained by conversion using time conversion information 30. This allows the frame of time-series data transmitted from each of control devices 2A, 2B to include the time (for example, the time obtained by conversion using time conversion information 30) indicating the timing at which each process variable is collected in processes 3A, 3B and the counter value. Examples of such a frame are illustrated in FIGS. 23 and 24. FIG. 23 illustrates frames of time-series data transmitted from control device 2A to time-series DB 450, and FIG. 24 illustrates frames of time-series data transmitted from control device 2B to time-series DB 450.

DB manager 451 uses the counter value or time included in the time-series data on the frame received from each of control devices 2A, 2B to allow the timings of the process variables included in the time-series data to match with each other. That is, even when process variables are collected by different control devices 2 (in different processes), DB manager 451 compiles the process variables with their respective time-bases almost exactly matched with each other, and stores the data obtained as a result of compilation as line data into time-series DB 450 as illustrated in FIG. 25. The line data stored in time-series DB 450 is used for, for example, analysis of the process variables.

K. Advantages

According to the present embodiment, each unit (function unit 200, CPU unit 100, function unit 300, and field machine 90) can achieve time synchronization with master clock 191A and time synchronization among units using its own control counter. In this case, each unit need not implement and execute a specific time reference protocol (for example, a costly protocol including a mechanism for compensating for fluctuations in time required for communications).

Regarding the above-described time synchronization, as illustrated in FIG. 16, any one unit in the unit group having the control counters synchronized with each other establishes a time synchronization relation with external master clock 191A, so that all the units having the control counters synchronized with each other can share the same time (time of master clock 191A).

Once the control counter of each unit is time-synchronized with master clock 191A, the "counter value" of the control counter can be made independent from the time of master clock 191A. This allows, even when there is a change in the configuration and environment relating to control system 1, such as the presence or absence of an external time server, low accuracy of management of the time of the time server, or a discontinuous change in the time provided by the time server, control system 1 to maintain the control counters of the units time-synchronized with each other. This makes it possible to maintain a stable control operation in control system 1.

L. Appendix

The present embodiment as described above includes the following technical ideas.

[Configuration 1]
A control system (1) for factory automation including:
a first unit (100) and a second unit (200) configured to exchange data with each other; and
a synchronization module (115, 215, 370) configured to synchronize a control counter (126) included in the first unit and a control counter (213) included in the second unit using a clock (191A, 128), wherein
each of the units includes an information storage (108, 208) configured to store information on conversion (30) for calculating time from a counter value of the counter of the unit, the information being shared between the units.

[Configuration 2]
The control system according to configuration 1, wherein the clock includes an external clock (191A) provided outside the units or an internal clock (128) included in one of the first and second units.

[Configuration 3]
The control system according to configuration 2, wherein when accuracy of time managed by the external clock satisfies a predetermined condition, the synchronization module adjusts, according to the time of the external clock, the counter value of the counter of the first unit and the counter value of the counter of the second unit that are synchronized with each other.

[Configuration 4]
The control system according to configuration 2 or 3, wherein when accuracy of time managed by the external clock does not satisfy a predetermined condition, the synchronization module synchronizes the counter of the first unit and the counter of the second unit based on time managed by the internal clock.

[Configuration 5]
The control system according to any one of configurations 2 to 4, wherein the information on conversion includes a difference between the counter value of each of the units and a reference counter value, and a conversion formula (36) for converting a reference time corresponding to the reference counter value into an actual time, and the reference time includes time of the clock.

[Configuration 6]
The control system according to configuration 5, wherein the one of the units includes a management module (115, 215) configured to manage the information on conversion shared with the other unit, and
the management module updates the information on conversion that has been shared in accordance with the clock used in synchronization of the control counters.

[Configuration 7]
The control system according to configuration 6, wherein when accuracy of time managed by the external clock does not satisfy a predetermined condition, the management module updates the conversion formula to set the reference counter value and the reference time to the counter value of the one of the units and time of the internal clock corresponding to the counter value, respectively.

[Configuration 8]
The control system according to any one of configurations 2 to 7, wherein
the first unit exchanges data with the second unit over a data bus (111),
the control system further includes a third unit (90) connected to the one of the units over a network (110),
the synchronization module further synchronizes the counter included in the one of the units and a control counter (91) included in the third unit, and the third unit stores the information on conversion shared among the units.

[Configuration 9]

The control system according to any one of configurations 1 to 8, wherein the information on conversion includes information on accuracy of time managed by the clock used in synchronization of the counters.

[Configuration 10]

The control system according to any one of configurations 1 to 9, wherein each of the units converts the counter value of a corresponding one of the counters into the time in accordance with the information on conversion that has been shared, and outputs a response including the time obtained by the conversion to an inquiry about the time received from an application.

[Configuration 11]

The control system according to configuration 10, wherein the conversion is performed when the inquiry is received.

[Configuration 12]

The control system according to configuration 10 or 11, wherein each of the units stores the time obtained by the conversion, and the response includes the time obtained by the conversion and stored.

It should be understood that the embodiments disclosed herein are illustrative in all respects and not restrictive. The scope of the present invention is defined by the claims rather than the above description, and the present invention is intended to include the claims, equivalents of the claims, and all modifications within the scope.

1: control system, 2: control device, 11, 12, 13, 14, 110: network, 23: counter synchronization program, 24: security program, 25, 178: correction program, 26: time management program, 30: time conversion information, 35: conversion table, 36: conversion formula, 90: field machine, 91A, 119, 121, 124, 125, 126, 168, 213: counter, 100: CPU unit, 370: unit, 111, 112: data bus, 113: signal line, 114, 216: synchronization processing unit, 115, 215: conversion information manager, 130: time synchronization signal, 177: time synchronization program, 179: conversion information management program, 200: function unit, 205: signal generator, 261: synchronization result

The invention claimed is:

1. A control system for factory automation, the control system comprising:
   a first device comprising a first control counter, a first storage storing one or more programs, and a first processor that accesses the first storage and executes at least one of the one or more programs to cause the first processor to control components of the first device and that accesses the first storage and executes at least one of the one or more programs to cause the first processor to control and perform various processing on a control target;
   a second device comprising a second counter, a second storage storing one or more programs, and a second processor that accesses the second storage and executes at least one of the one or more programs to cause the second processor to perform processing related to the second device, the second device being configured to exchange data with the first device; and
   a synchronization processing circuitry configured to synchronize the first control counter and the second control counter using a clock, wherein the first device includes a first information storage configured to store conversion information on a conversion for calculating a time from a time managed by the clock and a counter value of the first control counter, the second device includes a second information storage configured to store conversion information for calculating a time from the time managed by the clock and a counter value of the second control counter, the conversion information being shared respectively between the first device and the second device, wherein the synchronization processing circuitry determines whether an accuracy of a time managed by an external clock provided outside the control system satisfies a predetermined condition, switches the clock to the external clock when the accuracy of the time managed by the external clock satisfies the predetermined condition, and switches the clock to an internal clock included in one of the first device and the second device when the accuracy of time managed by the external clock does not satisfy the predetermined condition.

2. The control system according to claim 1, wherein, when the accuracy of the time managed by the external clock satisfies the predetermined condition, the synchronization processing circuitry adjusts, according to a time of the external clock, the counter value of the first control counter and the counter value of the second control counter.

3. The control system according to claim 1, wherein, when the accuracy of the time managed by the external clock does not satisfy the predetermined condition, the synchronization processing circuitry synchronizes the first counter and the second counter based on the time managed by the internal clock included in the one of the first device and the second device.

4. The control system according to claim 1, wherein:
   the conversion information includes a difference between the counter value of each of the first device and the second device and a reference counter value, and a conversion formula for converting a reference time corresponding to the reference counter value into an actual time, and
   the reference time includes a time of the clock used by the synchronization processing circuitry.

5. The control system according to claim 4, wherein:
   the one of the first device and the second device includes management processing circuitry configured to manage the conversion information shared with the other one of the first device and the second device, and
   the management processing circuitry of the one of the first device and the second device updates the conversion information that has been shared in accordance with the switching of the clock used in synchronization of the control counters and distributes the updated conversion information to the other one of the first device and the second device.

6. The control system according to claim 5, wherein when the accuracy of the time managed by the external clock does not satisfy the predetermined condition, the management processing circuitry updates the conversion formula to set the reference counter value and the reference time to the counter value of the one of the first device and the second device and the time of the internal clock corresponding to the counter value, respectively.

7. The control system according to claim 1, wherein
   the first device exchanges data with the second device over a data bus, the control system further comprises a third device connected to the one of the first device and the second device over a network, the synchronization processing circuitry further synchronizes the control counter included in the one of the first device and the second device and a control counter included in the third device, and the third device stores the conversion information shared among the first device, the second device, and the third device.

8. The control system according to claim 1, wherein the conversion information includes information on the accuracy of the time managed by the clock used in synchronization of the control counters.

9. The control system according to claim 1, wherein each of the first device and the second device converts the counter value of a corresponding one of the control counters into the time in accordance with the conversion information that has been shared, and outputs a response including the time obtained by the conversion in response to an inquiry about the time that has been received from an application.

10. The control system according to claim 9, wherein the conversion is performed when the inquiry is received.

11. The control system according to claim 9, wherein each of the first device and the second device stores the time obtained by the conversion, and the response includes the time that is obtained by the conversion and that is stored.

12. The control system according to claim 9, wherein the synchronization processing circuitry is implemented by at least one of the first processor or the second processor.

13. The control system according to claim 1, wherein the synchronization processing circuitry comprises a third storage storing one or more programs and a third processor that accesses the third storage and executes at least one of the one or more programs to cause the third processor to determine whether the accuracy of the time managed by the external clock satisfies the predetermined condition, switches the clock to the external clock when the accuracy of the time managed by the external clock satisfies the predetermined condition, and switches the clock to the internal clock included in one of the first device and the second device when the accuracy of time managed by the external clock does not satisfy the predetermined condition.

14. The control system according to claim 1, wherein:

the one of the first device and the second device includes management processing circuitry configured to manage the conversion information shared with the other one of the first device and the second device, and the management processing circuitry of the one of the first device and the second device updates the conversion information that has been shared in accordance with the switching of the clock used in synchronization of the control counters and distributes the updated conversion information to the other one of the first device and the second device.

* * * * *